United States Patent
Nanaumi et al.

(10) Patent No.: US 7,494,733 B2
(45) Date of Patent: Feb. 24, 2009

(54) ELECTRODE STRUCTURE FOR SOLID POLYMER FUEL CELL, ITS PRODUCTION METHOD, AND SOLID POLYMER FUEL CELL

(75) Inventors: Masaaki Nanaumi, Wako (JP); Yoichi Asano, Wako (JP); Nagayuki Kanaoka, Wako (JP); Hiroshi Sohma, Wako (JP); Naoki Mitsuta, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 703 days.

(21) Appl. No.: 10/480,375

(22) PCT Filed: Jun. 10, 2002

(86) PCT No.: PCT/JP02/05728

§ 371 (c)(1),
(2), (4) Date: Dec. 11, 2003

(87) PCT Pub. No.: WO02/101860

PCT Pub. Date: Dec. 19, 2002

(65) Prior Publication Data

US 2004/0180250 A1    Sep. 16, 2004

(30) Foreign Application Priority Data

| Jun. 11, 2001 | (JP) | 2001-175042 |
| Jun. 12, 2001 | (JP) | 2001-176695 |
| Jun. 14, 2001 | (JP) | 2001-180639 |
| Aug. 1, 2001 | (JP) | 2001-233023 |
| Aug. 9, 2001 | (JP) | 2001-242592 |

(51) Int. Cl.
H01M 8/10 (2006.01)
H01M 4/96 (2006.01)
H01M 4/92 (2006.01)

(52) U.S. Cl. .......................................... 429/33; 429/44
(58) Field of Classification Search ....................... None
See application file for complete search history.

(56) References Cited

U.S. PATENT DOCUMENTS 5,403,675 A    4/1995    Ogata et al.

(Continued)

FOREIGN PATENT DOCUMENTS

JP    58-164164    9/1983

(Continued)

OTHER PUBLICATIONS

Carey, Francis A. Organic Chemistry 4th ed. New York, 2000, p. 21.*

(Continued)

Primary Examiner—Susy Tsang-Foster
Assistant Examiner—Alix Echelmeyer
(74) Attorney, Agent, or Firm—Arent Fox LLP

(57) ABSTRACT

An electrode structure having a pair of electrode catalyst layers and a polymer electrolyte membrane held between both the electrode catalyst layers is provided. The polymer electrolyte membrane is a sulfonate of a hydrocarbon-based polymer comprising a main chain in which two or more benzene rings are bound together directly or through a divalent group. The membrane includes 5% or more by weight of water coordinated to protons of sulfonic acid groups. The polymer electrolyte membrane may include a fluorine-containing ion conducting polymer such that the ratio of fluorine content in the polymer electrolyte membrane to the fluorine content in the electrode catalyst layers is in the range of from 0.2 to 2.0. The electrode structure constitutes a fuel cell, which generates power when oxidizing gas is supplied to the one side of the electrode structure and reducing gas to the other side.

14 Claims, 4 Drawing Sheets

U.S. PATENT DOCUMENTS

| | | | |
|---|---|---|---|
| 5,985,477 | A | 11/1999 | Iwasaki et al. |
| 6,685,806 | B1 * | 2/2004 | Cadaval Fernandez De Leceta et al. .......................... 204/283 |
| 6,825,310 | B2 * | 11/2004 | Goto et al. .................... 528/86 |
| 2002/0061431 | A1 * | 5/2002 | Koyama et al. ............... 429/33 |
| 2005/0118477 | A1 * | 6/2005 | Kiefer et al. .................. 429/33 |

FOREIGN PATENT DOCUMENTS

| | | |
|---|---|---|
| JP | 6-93114 | 4/1994 |
| JP | 9-167622 | 6/1997 |
| JP | 10-21943 | 1/1998 |
| JP | 11-116679 | 4/1999 |
| JP | 2001-357858 * | 12/2001 |
| JP | 2002-216798 | 8/2002 |
| JP | 2002-216799 | 8/2002 |
| WO | WO 99/29763 | 6/1999 |
| WO | WO 00/38261 * | 6/2000 |

OTHER PUBLICATIONS

Development of The Membranes for Proton-Exchange Membrane Fuel Cell, pp. 93-99, pp. 103-105, May 31, 2000 (First Edition) CMC Publishing Co., Ltd.

Journal of Membrane Science; vol. 71, (1992); pp. 69-80.

* cited by examiner

ELECTRODE STRUCTURE FOR SOLID POLYMER FUEL CELL, ITS PRODUCTION METHOD, AND SOLID POLYMER FUEL CELL

TECHNICAL FIELD

The present invention relates to an electrode structure used for a polymer electrolyte fuel cell, a method for producing the same, and a polymer electrolyte fuel cell, which uses the electrode structure.

BACKGROUND ART

The petroleum source is beginning to dry up, and at the same time, environmental problems such as global warming due to the consumption of fossil fuel have increasingly become serious. Thus, a fuel cell receives attention as a clean power source for electric motors that is not accompanied with the generation of carbon dioxide. The above fuel cell has been widely developed, and some fuel cells have become commercially practical. When the above fuel cell is mounted in vehicles and the like, a polymer electrolyte fuel cell comprising a polymer electrolyte membrane is preferably used because it easily provides a high voltage and a large electric current.

As an electrode structure used for the above polymer electrolyte fuel cell, there has been known an electrode structure, which comprises a pair of electrode catalyst layers comprising a catalyst such as platinum supported by a catalyst carrier such as carbon black that is formed by integrating by an ion conducting polymer binder, a polymer electrolyte membrane capable of conducting ions sandwiched between the electrode catalyst layers, and a backing layer laminated on each of the electrode catalyst layers. When a separator acting also as a gas passage is further laminated on each of the electrode catalyst layers, the above electrode structure constitutes a polymer electrolyte fuel cell.

In the above polymer electrolyte fuel cell, one electrode catalyst layer is defined as a fuel electrode, and the other electrode catalyst layer is defined as an oxygen electrode. Now, reducing gas such as hydrogen or methanol is introduced into the fuel electrode through the above backing layer, whereas oxidizing gas such as air or oxygen is introduced into the oxygen electrode through the above backing layer. By this action, on the above fuel electrode side, protons are generated from the above reducing gas by the action of a catalyst contained in the above electrode catalyst layer. Then, the protons transfer to the electrode catalyst layer on the above oxygen electrode side through the above polymer electrolyte membrane. Thereafter, the protons are reacted with the above oxidizing gas introduced into the oxygen electrode by the action of the above catalyst contained in the electrode catalyst layer on the above oxygen electrode side, so as to generate water. Thus, the above fuel electrode is connected to the above oxygen electrode through using a conductor, so as to obtain electric current.

Previously, in the above electrode structures, a perfluoroalkylene sulfonic acid polymer (e.g., Nafion (trade name) from DuPont) has been widely used for the above polymer electrolyte membrane. The perfluoroalkylene sulfonic acid polymer is sulfonated, and accordingly it has an excellent proton conductivity. Moreover, the compound also has a chemical resistance as a fluorocarbon resin.

However, the compound is inconvenient in that it is extremely expensive.

DISCLOSURE OF THE INVENTION

It is an object of the present invention to solve such an inconvenience and to provide an inexpensive electrode structure for a polymer electrolyte fuel cell having an excellent power generation efficiency.

Moreover, it is another object of the present invention to provide a method for producing the above electrode structure for a polymer electrolyte fuel cell.

Furthermore, it is another object of the present invention to provide a polymer electrolyte fuel cell in which the above electrode structure is used.

To achieve the above objects, the electrode structure for a polymer electrolyte fuel cell (hereinafter abbreviated as an electrode structure at times) of the present invention comprises a pair of electrode catalyst layers and a polymer electrolyte membrane sandwiched between both the electrode catalyst layers, characterized in that the above polymer electrolyte membrane is a sulfonate of a hydrocarbon-based polymer comprising a main chain, in which two or more benzene rings are bound to one another, directly or through the medium of a divalent organic group.

Examples of the above hydrocarbon-based polymer may include compounds such as polyether ether ketone or polybenzimidazole, and rigid-rod polyphenylene disclosed in U.S. Pat. No. 5,403,675. The sulfonate of the rigid-rod polyphenylene disclosed in the above description comprises, as a main ingredient, a polymer obtained by polymerizing an aromatic compound having a phenylene chain.

Moreover, examples of the above hydrocarbon-based polymer may also include a copolymer consisting of a first repeating unit represented by the following general formula (1) and a second repeating unit represented by the following general formula (2):

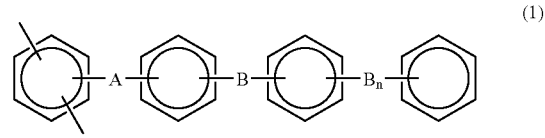

(1)

wherein A represents an electron attracting group, B represents an electron releasing group group, n is an integer of 0 or 1, and a benzene ring includes a derivative thereof, and

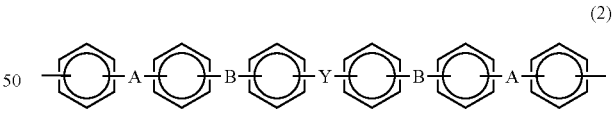

(2)

wherein A represents an electron attracting group, B represents an electron releasing group group, Y represents $-C(CF_3)_2-$ or $-SO_2-$, and a benzene ring includes a derivative thereof.

It should be noted that the term "electron attracting group" is used in the present description to mean a divalent group such as $-CO-$, $-CONH-$, $-(CF_2)_p-$ (wherein p is an integer of 1 to 10), $-C(CF_3)_2-$, $-COO-$, $-SO-$ or $-SO_2-$, in which the Hammett substituent constant is 0.06 or greater in the meta position of a phenyl group and it is 0.01 or greater in the para position thereof. It should be also noted that the term "electron releasing group group" is used herein to mean a divalent group such as $-O-$, $-S-$, $-CH=CH-$, or $-C\equiv C-$.

The above hydrocarbon-based polymer contains no, or a reduced amount of fluorine in a molecular structure thereof. Accordingly, when the sulfonate of the above hydrocarbon-based polymer is used as a material for the above polymer electrolyte membrane, an inexpensive electrode structure having an excellent power generation efficiency can be obtained.

When an electrode structure comprising a polymer electrolyte membrane composed of the above hydrocarbon-based polymer is activated at a lower temperature of 0° C. or lower, if water generated in the area of the above oxygen electrode and water contained in the above polymer electrolyte membrane freeze, a sufficient ion conductivity may not be obtained at times.

Thus, in the first aspect, the electrode structure of the present invention is characterized in that the above polymer electrolyte membrane contains 5% or more by weight of the coordinated water of a proton of a sulfonic acid group based on the total weight of the polymer electrolyte membrane.

It is known that a high polymer comprising the above sulfonic acid group contains coordinated water in the proton of the sulfonic acid group. The coordinated water does not freeze even below the freezing point. Thus, since the electrode structure for a polymer electrolyte fuel cell of the present invention contains at least 5% or more by weight of the coordinated water based on the total weight of the above polymer electrolyte membrane, even when it is activated at a low temperature of 0° C. or lower, it keeps water necessary for ion conduction, so that it can obtain an excellent ion conductivity.

Rigid-rod polyphenylene disclosed in U.S. Pat. No. 5,403,675 is excellent in ion conductivity and creep resistance in a high temperature environment, but it is insufficient in oxidation stability.

Thus, in the second aspect, the electrode structure of the present invention is characterized in that the above polymer electrolyte membrane comprises an ion conducting polymer containing fluorine in a molecular structure thereof, and in that the ratio (Y/X) of the content of fluorine in the above polymer electrolyte membrane (Y) to the content of fluorine in the above electrode catalyst layer (X) is within the range between 0.2 and 2.0.

The term "the content of fluorine in the above electrode catalyst layer (X)" is used herein to mean the weight ratio of fluorine contained in the molecular structure of the above ion conducting polymer binder based on the total weight of the above electrode catalyst layer. On the other hand, the term "the content of fluorine in the above polymer electrolyte membrane (Y)" is used herein to mean the weight ratio of fluorine contained in the molecular structure of the above ion conducting polymer based on the total weight of an ion conducting polymer constituting the above polymer electrolyte membrane.

The above Y/X is within the range between 0.2 and 2.0 in the electrode structure in the above second aspect, so that the electrode structure can obtain a good oxidation stability, as well as a good creep resistance when a fuel cell comprising the electrode structure is activated at a high temperature. If the above Y/X is less than 0.2, the electrode structure cannot obtain a sufficient oxidation stability. If the Y/X exceeds 2.0, the electrode structure cannot obtain a sufficient creep resistance when a fuel cell comprising the electrode structure is activated at a high temperature.

The electrode structure in the above second aspect is characterized in that the above polymer electrolyte membrane is a sulfonate of a copolymer of the first repeating unit represented by general formula (1) and the second repeating unit represented by general formula (2), and in that the first repeating unit or the second repeating unit contains fluorine.

Herein, sulfonation takes place only on a benzene ring to which no electron attracting group binds. Accordingly, when a copolymer of the first repeating unit represented by general formula (1) with the second repeating unit represented by general formula (2) is sulfonated, no sulfonic acid group is introduced either into any benzene ring within the first repeating unit, which belongs to the main chain of the copolymer, or any benzene ring within the second repeating unit, but benzene rings within the side chain of the first repeating unit may be sulfonated. Thus, in the above copolymer, the molar ratio between the first repeating unit and the second repeating unit is adjusted to control the amount of the introduced sulfonic acid group, so as to obtain a polymer electrolyte membrane having an excellent ion conductivity.

In the above second aspect, in order to obtain a copolymer constituting the above polymer electrolyte membrane, either one of, or both of the first repeating unit and the second repeating unit should contain fluorine in their molecular structure. The combination of 2,5-dichloro-4'-(4-phenoxyphenoxy)benzophenone represented by the following formula (3) and 2,2-bis[4-{4-(4-chlorobenzoyl)phenoxy}phenyl]-1,1,1,3,3,3-hexafluoropropane represented by the following formula (4) can be an example of the combination of the first repeating unit and the second repeating unit:

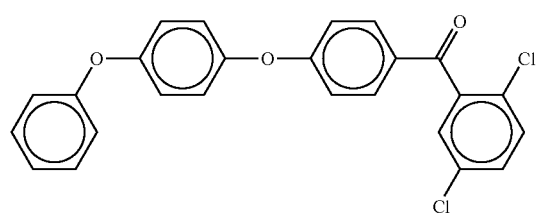

(3)

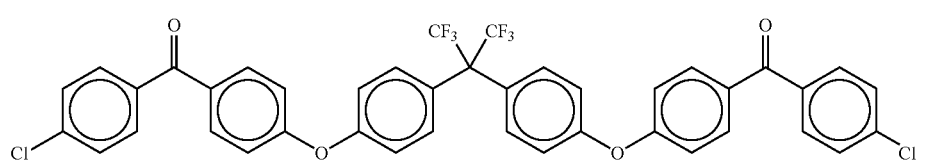

(4)

Since rigid-rod polyphenylene disclosed in U.S. Pat. No. 5,403,675 has low toughness, when the sulfonate of the rigid-rod polyphenylene is used for a polymer electrolyte membrane to constitute an electrode structure, the membrane is easily torn off. In addition, the rigid-rod polyphenylene disclosed in the above description cannot obtain a sufficient ion conductivity at times.

Thus, in the third aspect, the electrode structure of the present invention is characterized in that the above polymer electrolyte membrane is a sulfonate of a copolymer of the first repeating unit represented by general formula (1) and the second repeating unit represented by general formula (2), and in that the above electrode catalyst layer contains, as a catalyst, platinum within the range between 0.01 and 0.8 mg/cm$^2$, and the average diameter of a carbon particle as a carrier supporting the platinum is within the range between 10 and 100 nm.

In the above copolymer, as described above, the amount of the introduced sulfonic acid group can be controlled by adjusting the molar ratio between the first repeating unit and the second repeating unit. Hence, by controlling the amount of the introduced sulfonic acid group, a polymer electrolyte membrane having an excellent ion conductivity and toughness can be obtained.

In the above third aspect, a specific example of a monomer used as the first repeating unit may include 2,5-dichloro-4'-(4-phenoxyphenoxy)benzophenone represented by the above formula (3). Moreover, specific examples of a monomer used as the second repeating unit may include 2,2-bis[4-{4-(4-chlorobenzoyl)phenoxy}phenyl]-1,1,1,3,3,3-hexafluoropropane represented by the above formula (4), and 2,2-bis[4-{4-(4-chlorobenzoyl)phenoxy}phenyl]sulfone represented by the following formula (5):

and if it exceeds 100 nm, activation overvoltage increases. In both cases, a sufficient power generation efficiency might not be obtained.

In the electrode structure in the above third aspect, in order to control the amount of the introduced sulfonic acid group so as to set ion conductivity and toughness in a preferred range, the copolymer constituting the above polymer electrolyte membrane preferably comprises 10 to 80 mol % of the above first repeating unit and 90 to 20 mol % of the above second repeating unit. If the copolymer comprises less than 10 mol % of the above first repeating unit and more than 90 mol % of the above second repeating unit, the amount of a sulfonic acid group introduced into the copolymer decreases, and so a sufficient ion conductivity might not be obtained. In contrast, if the copolymer comprises more than 80 mol % of the above first repeating unit and less than 20 mol % of the above second repeating unit, the amount of a sulfonic acid group introduced into the copolymer increases, and so a sufficient toughness might not be obtained.

Moreover, in the electrode structure in the above third aspect, in order to set ion conductivity and toughness in a preferred range, the sulfonate of the copolymer constituting the above polymer electrolyte membrane preferably contains a sulfonic acid group within the range between 0.5 and 3.0 mg equivalent/g. If the amount of a sulfonic acid group contained in the above copolymer is less than 0.5 mg equivalent/g, a sufficient ion conductivity might not be obtained. If it exceeds 3.0 mg equivalent/g, a sufficient toughness might not be obtained.

In the fourth aspect, the electrode structure of the present invention is characterized in that the above polymer electrolyte membrane is produced by forming a membrane from a solution obtained by dissolving into a solvent a sulfonate of a

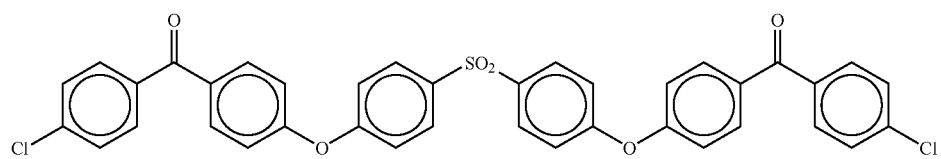

(5)

The sulfonate of the above copolymer is used for the above polymer electrolyte membrane in the electrode structure in the above third aspect, so that the electrode structure can be easily produced and the produced electrode structure can obtain an excellent power generation efficiency.

In the electrode structure in the above third aspect, the electrode catalyst layers sandwiching the above polymer electrolyte membrane contain, as a catalyst, platinum within the range between 0.01 and 0.8 mg/cm$^2$, and the average diameter of a carbon particle as a carrier supporting the platinum is within the range between 10 and 100 nm. By these features, the electrode structure can obtain a further excellent power generation efficiency.

If the content of the above platinum is less than 0.01 mg/cm$^2$, a sufficient power generation efficiency might not be obtained, and if it exceeds 0.8 mg/cm$^2$, the above platinum acts as a negative catalyst, and deterioration of the copolymer constituting the above polymer electrolyte membrane might be promoted.

If the average diameter of the above carbon particle is less than 10 nm, the dispersion of the above platinum is inhibited, copolymer of the first repeating unit represented by general formula (1) and the second repeating unit represented by general formula (2) and drying the obtained membrane, and in that the polymer electrolyte membrane contains 3 to 15% by weight of said solvent after drying it.

The above polymer electrolyte membrane is produced by forming a membrane from a solution obtained by dissolving into a solvent the sulfonate of the above copolymer according to cast method or the like, and drying the obtained membrane. Herein, the above polymer electrolyte membrane contains the above solvent within the range of 3 to 15% by weight after drying, and thereby it can obtain a particularly excellent toughness.

When the content of the above solvent is less than 3% by weight after drying, the above polymer electrolyte membrane cannot obtain a sufficient toughness, but when it exceeds 15% by weight, the membrane cannot obtain a sufficient power generation efficiency. N-methylpyrrolidone is suitable as a solvent to obtain an electrode structure having an excellent power generation efficiency.

In the electrode structure in the above fourth aspect, in order to control the amount of the introduced sulfonic acid group so as to set ion conductivity and toughness in a preferred range, the copolymer constituting the above polymer electrolyte membrane preferably comprises 10 to 80 mol % of the above first repeating unit and 90 to 20 mol % of the above second repeating unit. If the copolymer comprises less than 10 mol t of the above first repeating unit and more than 90 mol % of the above second repeating unit, the amount of a sulfonic acid group introduced into the copolymer decreases, and so a sufficient ion conductivity might not be obtained. In contrast, if the copolymer comprises more than 80 mol % of the above first repeating unit and less than 20 mol % of the above second repeating unit, the amount of a sulfonic acid group introduced into the copolymer increases, and so a sufficient toughness might not be obtained.

Moreover, in the electrode structure in the above fourth aspect, in order to set ion conductivity and toughness in a preferred range, the copolymer constituting the above polymer electrolyte membrane preferably contains a sulfonic acid group within the range between 0.5 and 3.0 mg equivalent/g. If the amount of a sulfonic acid group contained in the above copolymer is less than 0.5 mg equivalent/g, a sufficient ion conductivity might not be obtained. If it exceeds 3.0 mg equivalent/g, a sufficient toughness might not be obtained.

Furthermore, when the polymer electrolyte membrane comprising the above hydrocarbon-based polymer is intended to be integrated with the above pair of electrode catalyst layers by sandwiching it between the layers, a sufficient adhesion might not be attained between the above polymer electrolyte membrane and the electrode catalyst layers. If the adhesion between the above polymer electrolyte membrane and the above electrode catalyst layers is low, protons are inhibited from passing through the interface between the polymer electrolyte membrane and the electrode catalyst layer in the electrode structure, and thereby a good power generation efficiency cannot be obtained.

Thus, the method for producing an electrode structure of the present invention is characterized in that it comprises the steps of: sandwiching a polymer electrolyte membrane by a pair of electrode catalyst layers to integrate both the electrode catalyst layers and the polymer electrolyte membrane, so as to form an electrode structure; and applying an electric current of 0.1 A/cm$^2$ or higher to the electrode structure for 5 hours or more in a humidified environment at a relative humidity of 60% or more.

According to the production method of the present invention, a polymer electrolyte membrane is sandwiched between a pair of electrode catalyst layers for integration, so as to form an electrode structure, and thereafter, an electric current of 0.1 A/cm$^2$ or higher is applied to the electrode structure for 5 hours or more in a humidified environment at a relative humidity of 60% or more. By this process, the generated protons penetrate into the above polymer electrolyte membrane on the fuel electrode side of the above electrode structure. Moreover, by the penetration of the protons, water transfers from the oxygen electrode side into the above polymer electrolyte membrane.

As a result, the electrode structure adopts a structure such that each electrode catalyst layer penetrates into the polymer electrolyte membrane side at the interface between the catalyst layer and the membrane, thereby improving the adhesion between each electrode catalyst layer and the polymer electrolyte membrane.

The phenomenon that each of the above electrode catalyst layers penetrates on the above polymer electrolyte membrane side can be confirmed by measuring the length of the interface between each electrode catalyst layer and the polymer electrolyte membrane, using a map meter and the like. In the electrode structure produced by the process according to the present invention, in order to improve the adhesion between each of the above electrode catalyst layers and the above polymer electrolyte membrane, the actual length of the interface is preferably 15% or more longer than the slant distance between any given two points on the interface between each electrode catalyst layer and the polymer electrolyte membrane (the actual interface length/the slant distance≧1.15).

For the measurement of the length of the above interface, it is desirable to set the slant distance between the above any given two points at 10 µm or longer and to make the average of the results obtained by measuring any given 7 or more slant distances.

According to the production method of the present invention, in order that protons generated in the above fuel electrode easily transfer, it is necessary to apply an electric current to the above electrode structure in a humidified environment at a relative humidity of 60% or more. In an environment where a relative humidity is less than 60%, when an electric current is applied to the above electrode structure, the phenomenon that the above electrode catalyst layer penetrates on the polymer electrolyte membrane side hardly occurs.

In addition, according to the production method of the present invention, an electric current of 0.1 A/cm$^2$ or higher, preferably of 0.1 to 2 A/cm$^2$ is applied to the above electrode structure for 5 hours or more, preferably for 8 hours or more, in the above humidified environment.

When an electric current of less than 0.1 A/cm$^2$ is applied, the effect of improving the adhesion between the above electrode catalyst layer and the above polymer electrolyte membrane cannot be obtained. In contrast, when an electric current of more than 2 A/cm$^2$ is applied, the deterioration of the electrode structure occurs. When an electric current is applied for shorter than 5 hours, the effect of improving the adhesion between the above electrode catalyst layer and the above polymer electrolyte membrane cannot be obtained.

The production method of the present invention can be applied even in a case where the above polymer electrolyte membrane is a perfluoroalkylene sulfonic acid polymer, but it can be preferably applied in a case where the above polymer electrolyte membrane is a sulfonate of a hydrocarbon-based polymer comprising a main chain, in which two or more benzene rings are bound to one another, directly or through the medium of a divalent organic group.

Examples of the above hydrocarbon-based polymer may include polyether ether ketone, polybenzimidazole, and rigid-rod polyphenylene disclosed in U.S. Pat. No. 5,403,675. In order to obtain a polymer electrolyte membrane that is excellent in ion conductivity and mechanical strength, however, the hydrocarbon-based polymer is preferably a copolymer, which comprises a main chain comprising the first repeating unit represented by general formula (1) and the second repeating unit represented by general formula (2).

Since the second repeating unit represented by general formula (2) comprises a main chain having a flexible structure, it improves the mechanical strength of the above copolymer such as toughness.

In order to control the amount of the introduced sulfonic acid group so as to set the ion conductivity and mechanical strength of the copolymer in a preferred range, the molar ratio between the first repeating unit and the second repeating unit is preferably adjusted in the range of 10 to 80 mol % of the first repeating unit and 90 to 20 mol % of the second repeating unit. When the copolymer comprises less than 10 mol % of the first repeating unit and more than 90 mol % of the second repeating unit, the amount of a sulfonic acid group introduced into the copolymer is insufficient, and so the above polymer electrolyte membrane has a low ion conductivity. In contrast, when the copolymer comprises more than 80 mol % of the first repeating unit and less than 20 mol % of the second repeating unit, the above polymer electrolyte membrane cannot have a sufficient mechanical strength.

The above copolymer preferably has a polymer molecular weight of 10,000 to 1,000,000 at a weight-average molecular weight shown using polystyrene conversion. If the above polymer molecular weight is less than 10,000, a mechanical strength that is preferable as a polymer electrolyte membrane might not be obtained. If it exceeds 1,000,000, when the polymer is dissolved in a solvent to form a membrane, the dissolubility decreases or the viscosity of the solution increases, and thereby it becomes difficult to treat the polymer.

Moreover, the above copolymer is sulfonated preferably such that it contains a sulfonic acid group within the range between 0.5 and 3.0 mg equivalent/g. If the obtained sulfonate contains less than 0.5 mg equivalent/g of sulfonic acid group, it cannot obtain a sufficient ion conductivity. If the content of a sulfonic acid group exceeds 3.0 mg equivalent/g, a sufficient toughness cannot be obtained, and it becomes difficult to treat the sulfonate during the production of an electrode structure.

Both the electrode structure in each aspect of the present invention and the electrode structure obtained by the production method of the present invention constitute a polymer electrolyte fuel cell, which generates electric power, when oxidizing gas is supplied to the one side of the above electrode structure and reducing gas to the other side.

BEST MODE FOR CARRYING OUT THE INVENTION

First, a first embodiment of the electrode structure of the present invention will be explained below.

Figure 1:
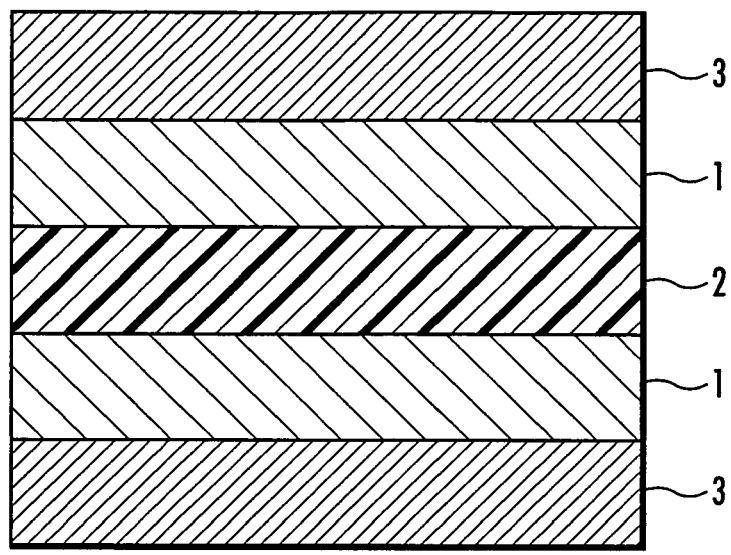
FIG. 1 is an illustrative sectional view of the electrode structure for a polymer electrolyte fuel cell of the present invention.

As shown in FIG. 1, the electrode structure in the present embodiment comprises a pair of electrode catalyst layers 1, 1, a polymer electrolyte membrane 2 sandwiched between both the electrode catalyst layers 1, 1, and backing layers 3, 3 laminated on the electrode catalyst layers 1, 1 respectively.

The electrode catalyst layer 1 is produced by screen printing a catalyst paste consisting of a catalyst particle and an ion conducting polymer binder on the backing layer 3, so that a certain amount (e.g., 0.5 mg/cm$^2$) of catalyst is kept thereon, and then drying it. The above catalyst particle consists of a platinum particle that is supported by carbon black (furnace black) at a certain weight ratio (e.g., carbon black:platinum=1:1). The above catalyst paste is prepared by uniformly dispersing the above catalyst particles in a solution containing an ion conducting polymer binder such as a perfluoroalkylene sulfonic acid polymer (e.g., Nafion (trade name) from DuPont) at a certain weight ratio (e.g., catalyst particle:binder solution=1:1).

The backing layer 3 consists of a substrate layer and a carbon paper. The above substrate layer is formed by mixing carbon black and polytetrafluoroethylene (PTFE) particles at a certain weight ratio (e.g., carbon black:PTFE particle=4:6), uniformly dispersing the obtained mixture in a solvent such as ethylene glycol so as to obtain a slurry, and applying the slurry on the one side of the above carbon paper followed by drying it.

The catalyst paste screen printed on the backing layer 3 is dried, for example, by drying at 60° C. for 10 minutes and then vacuum drying at 120° C. for 60 minutes.

The polymer electrolyte membrane 2 in the present embodiment is a sulfonate of a copolymer obtained by polymerizing a first repeating unit represented by the following general formula (1) and a second repeating unit represented by the following general formula (6) at a certain molar ratio, or of a polymer such as polyether ether ketone represented by the following formula (7):

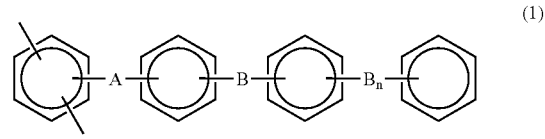

(1)

wherein A represents an electron attracting group, B represents an electron releasing group group, n is an integer of 0 or 1, and a benzene ring includes a derivative thereof, and

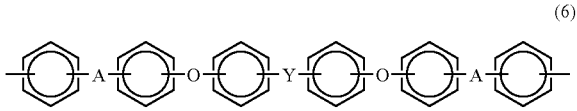

(6)

wherein A represents an electron attracting group, Y represents —C(CF$_3$)$_2$— or —SO$_2$—, and a benzene ring includes a derivative thereof, or

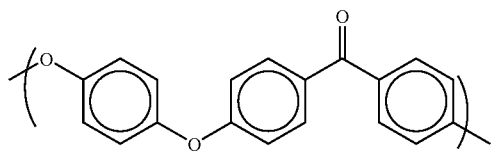

(7)

An example of a monomer used as the first repeating unit represented by the above general formula (1) includes 2,5-dichloro-4'-(4-phenoxyphenoxy)benzophenone represented by the following formula (3).

Examples of a monomer used as the second repeating unit represented by the above general formula (6) include 2,2-bis[4-{4-(4-chlorobenzoyl)phenoxy}phenyl]-1,1,1,3,3,3-hexafluoropropane represented by the following formula (4) and 2-bis[4-{4-(4-chlorobenzoyl)phenoxy}phenyl]sulfone represented by the following formula (5):

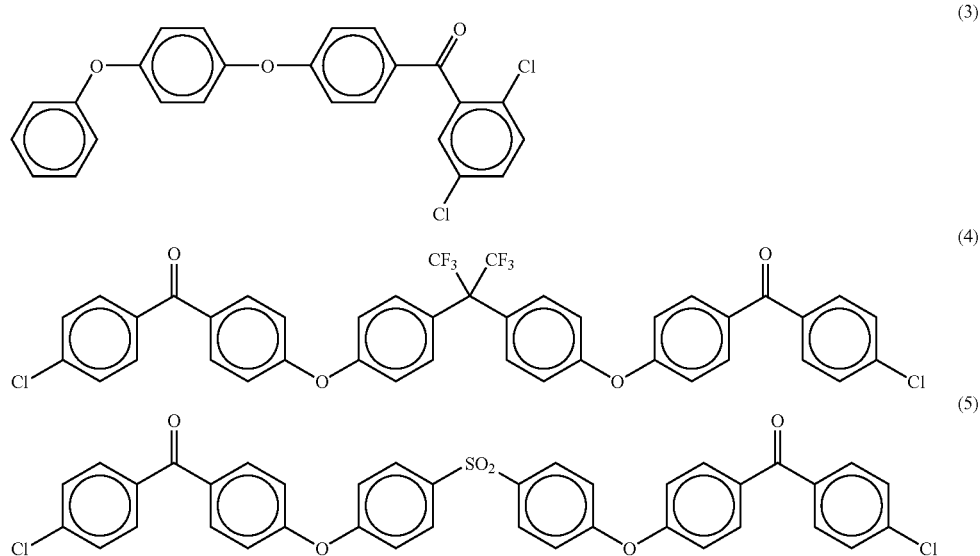

The above polymer preferably has a polymer molecular weight of 10,000 to 1,000,000 at a weight-average molecular weight shown using polystyrene conversion. If the above polymer molecular weight is less than 10,000, a mechanical strength that is preferable as a polymer electrolyte membrane might not be obtained. If it exceeds 1,000,000, as described later, when the polymer is dissolved in a solvent to form a membrane, the dissolubility decreases or the viscosity of the solution increases, and thereby it becomes difficult to treat the polymer.

Thereafter, concentrated sulfuric acid is added to the above polymer for sulfonation, such that it contains a sulfonic acid group within the range between 0.5 and 3.0 mg equivalent/g. If the obtained sulfonate contains less than 0.5 mg equivalent/g of sulfonic acid group, it cannot obtain a sufficient ion conductivity. If the content of a sulfonic acid group exceeds 3.0 mg equivalent/g, a sufficient toughness cannot be obtained, and it makes difficult to treat the sulfonate during the production of an electrode structure, which will be described later.

The sulfonate of the above polymer is then dissolved in N-methylpyrrolidone to prepare a polymer electrolyte solution. Thereafter, a membrane is formed from the polymer electrolyte solution by the cast method followed by drying in an oven, so as to prepare, for example, the polymer electrolyte membrane 2 having a dry film thickness of 50 μm.

In the present embodiment, the polymer electrolyte membrane 2 is sandwiched between the sides of the electrode catalyst layers 1 of the above electrodes followed by hot pressing, so as to obtain the electrode structure as shown in FIG. 1. The hot pressing is carried out, for example, at 150° C. at 2.5 MPa for 1 minute.

When a separator acting also as a gas passage is further laminated on each of the backing layers 3, 3, the electrode structure in the present embodiment constitutes a polymer electrolyte fuel cell.

In the present embodiment, the sulfonate forming the polymer electrolyte membrane 2 contains at least 5% by weight of the coordinated water of a proton of a sulfonic acid group based on the total weight of the above polymer electrolyte membrane 2. The coordinated water can be measured as follows.

In the present description, as the above polymer electrolyte membrane 2, a polymer electrolyte membrane comprising a sulfonic acid group is referred to as a sulfonic acid type polymer electrolyte membrane. To measure the amount of the coordinated water of the above polymer electrolyte membrane 2, first, 50 mg of the sulfonic acid type polymer electrolyte membrane is left for 1 hour or more under a constant temperature and constant humidity environment of 85° C. and a relative humidity of 90%, which simulates the condition of an electrolyte membrane when a fuel cell is in operation, and then the weight of the membrane in a wet state (a) is measured.

Thereafter, a sample whose membrane weight (a) is measured is dried in a vacuum drying oven at 110° C. for 16 hours, and then the weight of the membrane in a dry state (b) is measured. Now, the content of water in the sulfonic acid type polymer electrolyte membrane ($W_1$) is defined as the amount (a–b) obtained by subtracting the membrane weight in a dry state (b) from the membrane weight in a wet state (a). The water content of the sulfonic acid type polymer electrolyte membrane ($W_1$) is the total amount of free water contained in the electrolyte membrane and the coordinate water.

Thereafter, 100 mg of the sulfonic acid type polymer electrolyte membrane is immersed in 300 ml of a NaCl aqueous solution (1 mol/l, liquid temperature: 25° C.), so that the proton of the sulfonic acid group is substituted by sodium. In the present description, a polymer electrolyte membrane, in which the proton of the sulfonic acid group is substituted by sodium, is referred to as a sodium type polymer electrolyte membrane. Thereafter, 50 mg of the sodium type polymer electrolyte membrane is treated in the same manner as in the case of the sulfonic acid type polymer electrolyte membrane, (3) was polymerized with 2,2-bis[4-{4-(4-chlorobenzoyl) phenoxy}phenyl]-1,1,1,3,3,3-hexafluoropropane represented by the above formula (4) at a molar ratio of 90:10, so as to obtain a copolymer (n:m=90:10) represented by formula (8) indicated below.

Herein, formula (8) indicates a random polymer, which contains the first repeating unit corresponding to formula (3) and the second repeating unit corresponding to formula (4) at a molar ratio of n:m. It does not indicate a block polymer, in which a polymer obtained by binding n number of the consecutive first repeating units corresponding to formula (3) binds to another polymer obtained by binding m number of the consecutive second repeating units corresponding to formula (4).

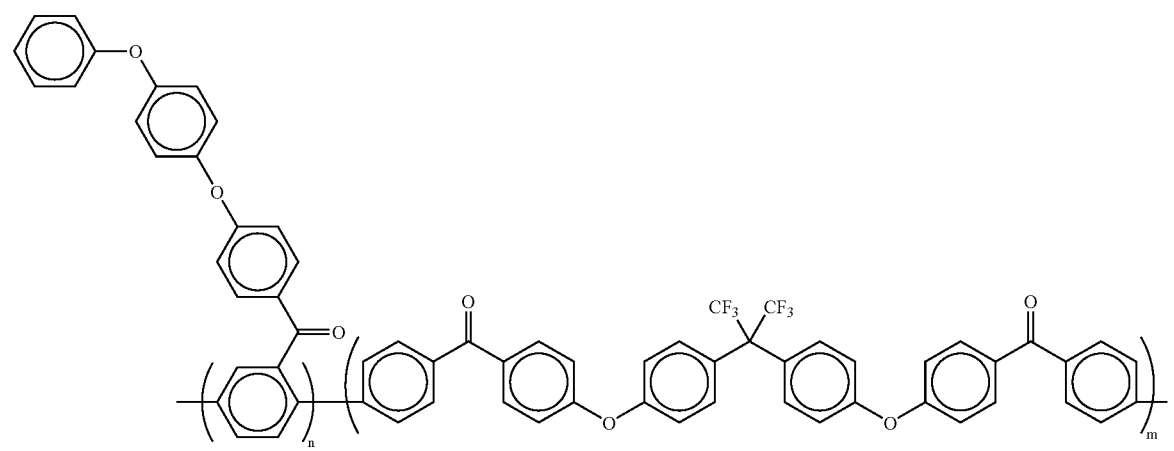

(8)

and then the wet membrane weight (c) and the dry membrane weight (d) of the sodium type polymer electrolyte membrane are measured. Now, the content of water in the sodium type polymer electrolyte membrane ($W_2$) is defined as the amount (c–d) obtained by subtracting the dry membrane weight (d) from the wet membrane weight (c). In the sodium type polymer electrolyte membrane, the proton of the sulfonic acid group is substituted by sodium, and so no protons are present. Accordingly, the sodium type polymer electrolyte membrane contains no coordinated water, and its water content ($W_2$) indicates the net amount of free water contained in the electrolyte membrane.

Thus, the amount of the coordinated water of the polymer electrolyte membrane 2 (W) can be calculated by obtaining the amount ($W_1-W_2$) obtained by subtracting the water content of the sodium type polymer electrolyte membrane ($W_2$) from the water content of the sulfonic acid type polymer electrolyte membrane ($W_1$). It should be noted that each of the water content of the sulfonic acid type polymer electrolyte membrane ($W_1$) and the water content of the sodium type polymer electrolyte membrane ($W_2$) is a mean value obtained from 3 samples.

Next, the present embodiment will be described in the following Examples and Comparative Examples.

EXAMPLE 1

In the present example, first, 2,5-dichloro-4'-(4-phenoxyphenoxy)benzophenone represented by the above formula Thereafter, concentrated sulfuric acid was added to the above copolymer for sulfonation, so as to obtain a sulfonate having an ion exchange capacity of 1.0 meq/g. Thereafter, the sulfonate of the above copolymer was dissolved in N-methylpyrrolidone to prepare a polymer electrolyte solution. A membrane was formed from the polymer electrolyte solution by the cast method followed by drying in an oven, so as to prepare a membrane having a dry film thickness of 50 μm, and the membrane was defined as the polymer electrolyte membrane 2.

Subsequently, a platinum particle was supported by carbon black (furnace black) at a weight ratio of carbon black:platinum =1:1, so as to prepare a catalyst particle. Then, using a solution containing a perfluoroalkylene sulfonic acid polymer (e.g., Nafion (trade name) from DuPont) as an ion conducting polymer binder, the above catalyst particles were uniformly mixed in the binder at a weight ratio of binder: carbon black=1:1, so as to prepare a catalyst paste.

Thereafter, carbon black was mixed with polytetrafluoroethylene (PTFE) particles at a weight ratio of carbon black: PTFE particle=4:6. The obtained mixture was uniformly dispersed in a solvent such as ethylene glycol to obtain a slurry. The obtained slurry was applied on the one side of the above carbon paper followed by drying it, so as to obtain a substrate layer. Then, two of the backing layers 3 were prepared, each of which consisted of the substrate layer and the carbon paper.

Thereafter, the above catalyst paste was screen printed on each of the above backing layers 3, so that 0.5 mg/cm² platinum was kept thereon. Then, drying was carried out so as to prepare an electrode catalyst layer 1. Thus, a pair of electrodes were prepared, each of which consisted of the electrode catalyst layer 1 and the backing layer 3.

Thereafter, the polymer electrolyte membrane 2 was sandwiched between the sides of the electrode catalyst layers 1 of the above electrodes, and hot pressing was then carried out to obtain the electrode structure as shown in FIG. 1.

Thereafter, the amount of coordinated water contained in the polymer electrolyte membrane 2 of the present example was measured by the above described method. Moreover, the polymer electrolyte membrane 2 of the present example was fixed in a jig to which a platinum electrode was attached. The ion conductivity of the membrane was measured by the alternating two-terminal method (frequency: 10 kHz) at −40° C. in a dry state in a low temperature bath. The results are shown in Table 1 and FIG. 2.

EXAMPLE 2

In the present example, the electrode structure as shown in FIG. 1 was obtained completely in the same manner as in Example 1 with the exception that polyether ether ketone represented by the above formula (7) was used instead of the copolymer represented by the above formula (8) in Example 1.

Thereafter, the amount of coordinated water based on the total weight of the polymer electrolyte membrane 2 and the ion conductivity of the polymer electrolyte membrane 2 in the present example were obtained completely in the same manner as in Example 1. The results are shown in Table 1 and FIG. 2.

EXAMPLE 3

In the present example, the electrode structure as shown in FIG. 1 was obtained completely in the same manner as in Example 1 with the exception that a copolymer (n:m=90:10) represented by formula (9) indicated below was used instead of the copolymer represented by the above formula (8) in Example 1.

Herein, formula (9) indicates a random polymer, which contains the first repeating unit and the second repeating unit at a molar ratio of n:m. It does not indicate a block polymer, in which a polymer obtained by binding n number of the consecutive first repeating units binds to another polymer obtained by binding m number of the consecutive second repeating units.

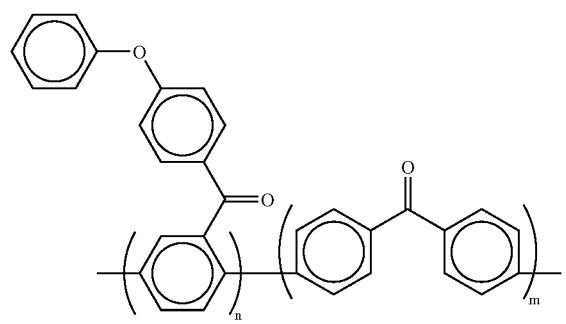

(9)

Thereafter, the amount of coordinated water based on the total weight of the polymer electrolyte membrane 2 and the ion conductivity of the polymer electrolyte membrane 2 in the present example were obtained completely in, the same manner as in Example 1. The results are shown in Table 1 and FIG. 2.

COMPARATIVE EXAMPLE 1

In the present comparative example, the electrode structure as shown in FIG. 1 was obtained completely in the same manner as in Example 1 with the exception that polyether ether ketone type polymer represented by the following formula (10) was used instead of the copolymer represented by the above formula (8) in Example 1:

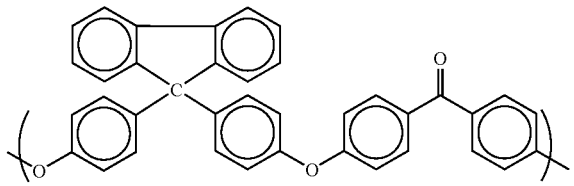

(10)

Thereafter, the amount of coordinated water based on the total weight of the polymer electrolyte membrane 2 and the ion conductivity of the polymer electrolyte membrane 2 in the present comparative example were obtained completely in the same manner as in Example 1. The results are shown in Table 1 and FIG. 2.

COMPARATIVE EXAMPLE 2

In the present comparative example, the electrode structure as shown in FIG. 1 was obtained completely in the same manner as in Example 1 with the exception that a perfluoroalkylene sulfonic acid polymer (Nafion 112 (trade name) from DuPont) was used instead of a sulfonate of the copolymer represented by the above formula (8) in Example 1.

Thereafter, the amount of coordinated water based on the total weight of the polymer electrolyte membrane 2 and the ion conductivity of the polymer electrolyte membrane 2 in the present comparative example were obtained completely in the same manner as in Example 1. The results are shown in Table 1 and FIG. 2.

TABLE 1

|  | Amount of coordinated water (weight %) | Ion conductivity (S/cm) |
|---|---|---|
| Example 1 | 6.4 | 0.0071 |
| Example 2 | 5.5 | 0.0054 |
| Example 3 | 10.0 | 0.0080 |
| Comparative Example 1 | 0.7 | 0.0004 |
| Comparative Example 2 | 3.6 | 0.0023 |

Figure 2:
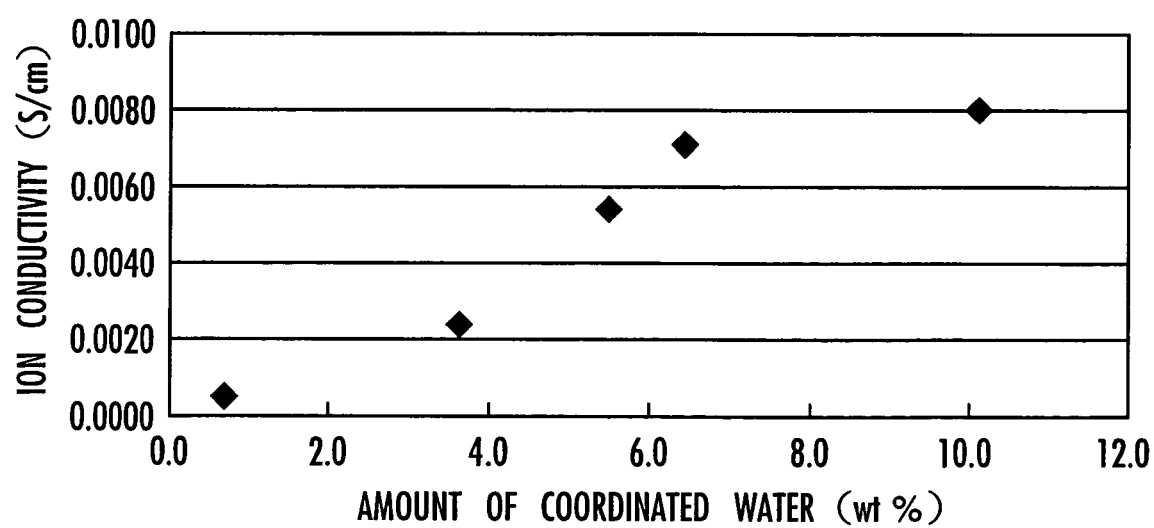
FIG. 2 is a graph showing the relationship between the amount of coordinated water based on the total weight of the polymer electrolyte membrane and ion conductivity.

From Table 1 and FIG. 2, it is clear that when compared with the electrode structures of Comparative Examples 1 and 2 in which the amount of coordinated water based on the total weight of the polymer electrolyte membrane 2 is less than 5% by weight, the electrode structures of Examples 1 to 3 in which the above amount is 5 or more % by weight have an excellent ion conductivity even in a low temperature condition of −40° C.

Next, a second embodiment of the electrode structure of the present invention will be explained below.

As shown in FIG. 1, the electrode structure in the present embodiment comprises a pair of electrode catalyst layers 1, 1, a polymer electrolyte membrane 2 sandwiched between both the electrode catalyst layers 1, 1, and backing layers 3, 3 laminated on the electrode catalyst layers 1, 1 respectively.

The electrode catalyst layer 1 is produced by screen printing a catalyst paste consisting of a catalyst particle and a fluorine-containing ion conducting polymer binder on the backing layer 3, so that a certain amount (e.g., 0.5 mg/cm$^2$) of catalyst is kept thereon, and then drying it. The above catalyst particle consists of a platinum particle that is supported by carbon black (furnace black) at a certain weight ratio (e.g., carbon black:platinum=1:1). The above catalyst paste is prepared by uniformly dispersing the above catalyst particles in a solution containing a fluorine-containing ion conducting polymer binder such as a perfluoroalkylene sulfonic acid polymer (e.g., Nafion (trade name) from DuPont) at a certain weight ratio (e.g., catalyst particle:binder solution=1:1).

The backing layer 3 consists of a substrate layer and a carbon paper. The above substrate layer is formed by mixing carbon black and polytetrafluoroethylene (PTFE) particles at a certain weight ratio (e.g., carbon black:PTFE particle=4:6), uniformly dispersing the obtained mixture in a solvent such as ethylene glycol so as to obtain a slurry, and applying the slurry on the one side of the above carbon paper followed by drying it.

The catalyst paste screen printed on the backing layer 3 is dried, for example, by drying at 60° C. for 10 minutes and then vacuum drying at 120° C. for 60 minutes.

The polymer electrolyte membrane 2 is a sulfonate of a fluorine-containing copolymer represented by the following formula (8) that is obtained, for example, by polymerizing 2,5-dichloro-4'-(4-phenoxyphenoxy)benzophenone represented by the following formula (3) with 2,2-bis[4-{4-(4-chlorobenzoyl)phenoxy}phenyl]-1,1,1,3,3,3-hexafluoropropane represented by the following formula (4) at a certain polymerization ratio:

(3)

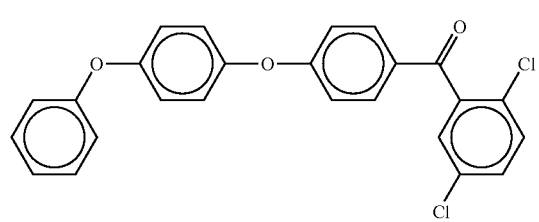

(4)

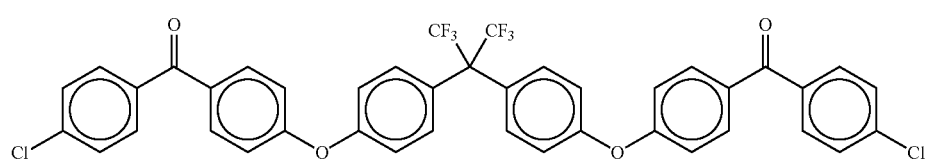

(8)

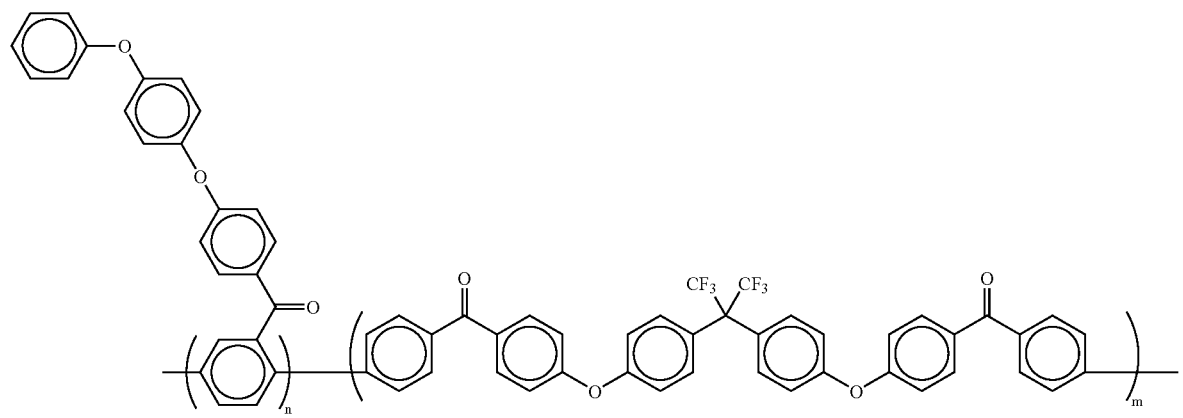

The above fluorine-containing copolymer preferably has a polymer molecular weight of 10,000 to 1,000,000 at a weight-average molecular weight shown using polystyrene conversion. If the above polymer molecular weight is less than 10,000, a mechanical strength that is preferable as a polymer electrolyte membrane might not be obtained. If it exceeds 1,000,000, as described later, when the polymer is dissolved in a solvent to form a membrane, the dissolubility decreases or the viscosity of the solution increases, and thereby it becomes difficult to treat the polymer.

Thereafter, concentrated sulfuric acid is added to the above copolymer for sulfonation, such that the sulfonate of the above fluorine-containing copolymer contains sulfonic acid groups within the range between 0.5 and 3.0 mg equivalent/g. If the obtained sulfonate contains less than 0.5 mg equivalent/g of sulfonic acid group, it cannot obtain a sufficient ion conductivity. If the content of a sulfonic acid group exceeds 3.0 mg equivalent/g, a sufficient toughness cannot be obtained, and it makes difficult to treat the sulfonate during the production of an electrode structure, which will be described later.

The sulfonate of the above fluorine-containing copolymer is then dissolved in N-methylpyrrolidone to prepare a polymer electrolyte solution. Thereafter, a membrane is formed from the polymer electrolyte solution by the cast method followed by drying in an oven, so as to prepare, for example, the polymer electrolyte membrane 2 having a dry film thickness of 50 μm. Alternatively, the polymer electrolyte membrane 2 may also be prepared as a composite membrane. The composite membrane comprises a fluorine-containing ion conducting polymer-coated layer with a dry film thickness of 5 μm, for example, which is formed by further casting a fluorine-containing ion conducting polymer solution such as a perfluoroalkylene sulfonic acid polymer (e.g., Nafion (trade name) from DuPont) on both sides of the membrane formed from the above polymer electrolyte solution.

In the present embodiment, the polymer electrolyte membrane 2 is sandwiched between the sides of the electrode catalyst layers 1 of the above electrodes followed by hot pressing, so as to obtain the electrode structure as shown in FIG. 1. The hot pressing is carried out by, for example, performing the first pressing at 80° C. at 5 MPa for 2 minutes and then the second pressing at 160° C. at 4 MPa for 1 minute.

When a separator acting also as a gas passage is further laminated on each of the backing layers 3, 3, the electrode structure in the present embodiment constitutes a polymer electrolyte fuel cell.

Next, the present embodiment will be described in the following examples and comparative examples.

EXAMPLE 4

In the present example, first, 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 88:12, so as to obtain a fluorine-containing copolymer (n:m=88:12) represented by formula (8).

Thereafter, concentrated sulfuric acid was added to the above copolymer for sulfonation, so as to obtain a sulfonate having an ion exchange capacity of 1.9 meq/g. Thereafter, the sulfonate of the above copolymer was dissolved in N-methylpyrrolidone to prepare a polymer electrolyte solution. A membrane was formed from the polymer electrolyte solution by the cast method followed by drying in an oven, so as to prepare the polymer electrolyte membrane 2 having a dry film thickness of 50 μm. The content of fluorine in the polymer electrolyte membrane 2 (Y) was 10% by weight.

Subsequently, a platinum particle was supported by carbon black (furnace black) at a weight ratio of carbon black:platinum=1:1, so as to prepare a catalyst particle. Then, using a solution containing a perfluoroalkylene sulfonic acid polymer (Nafion (trade name) from DuPont) as a fluorine-containing ion conducting polymer binder, the above catalyst particles were uniformly dispersed in the binder at a weight ratio of binder:carbon black=1:1, so as to prepare a catalyst paste.

Thereafter, carbon black was mixed with polytetrafluoroethylene (PTFE) particles at a weight ratio of carbon black:PTFE particle=4:6. The obtained mixture was uniformly dispersed in a solvent such as ethylene glycol to obtain a slurry. The obtained slurry was applied on the one side of the above carbon paper followed by drying it, so as to obtain a substrate layer. Then, two of the backing layers 3 were prepared, each of which consisted of the substrate layer and the carbon paper.

Thereafter, the above catalyst paste was screen printed on each of the above backing layers 3, so that 0.5 mg/cm² platinum was kept thereon. Then, drying was carried out so as to prepare an electrode catalyst layer 1. Thus, a pair of electrodes were prepared, each of which consisted of the electrode catalyst layer 1 and the backing layer 3. The content of fluorine in the electrode catalyst layer 1 (X) was 24% by weight.

Thereafter, the polymer electrolyte membrane 2 was sandwiched between the sides of the electrode catalyst layers 1 of the above electrodes, and hot pressing was then carried out to obtain the electrode structure as shown in FIG. 1. As a result, in the electrode structure in the present example, the ratio (Y/X) of the content of fluorine in the polymer electrolyte membrane 2 (Y) to the content of fluorine in the electrode catalyst layer 1 (X) was 0.42.

Figure 3:
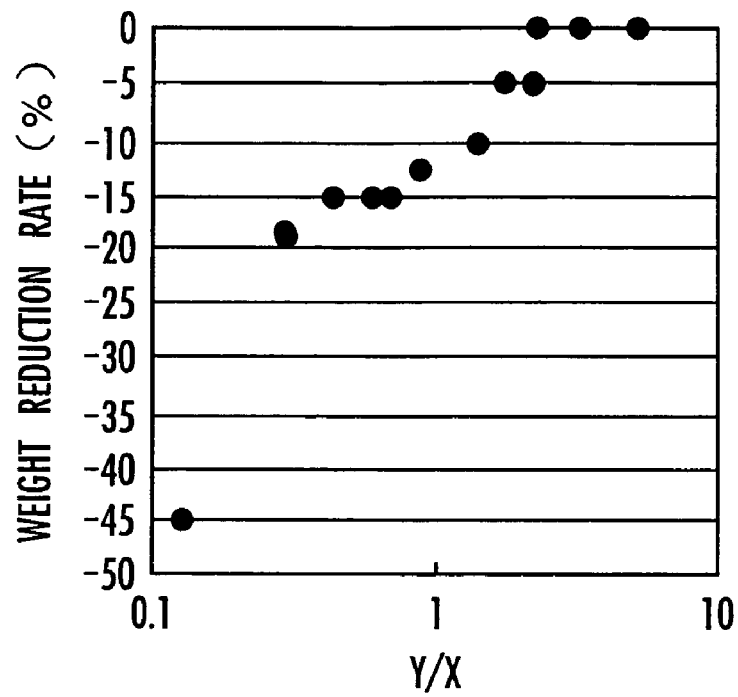
FIG. 3 is a graph showing the relationship between the ratio (Y/X) of the content of fluorine in the polymer electrolyte membrane (Y) to the content of fluorine in the electrode catalyst layer (X) and the oxidation stability of the electrode structure.

Thereafter, the oxidation stability, creep resistance, and power generation efficiency of the electrode structure in the present example were evaluated. The polymer electrolyte membrane 2 was immersed for 10 hours in an aqueous solution (Fenton's reagent) with a $H_2O_2$ concentration of 3%, a Fe concentration of 20 ppm, and a liquid temperature of 40° C., and then its weight reduction rate (%) was measured. The oxidation stability was defined as such a weight reduction rate. The above weight reduction rate indicates the amount of the polymer electrolyte membrane 2 dissolved in the above reagent. The smaller the figure, the higher the oxidation stability that can be obtained. The results are shown in Table 2. The relationship between the ratio (Y/X) and oxidation stability is shown in FIG. 3.

Figure 4:
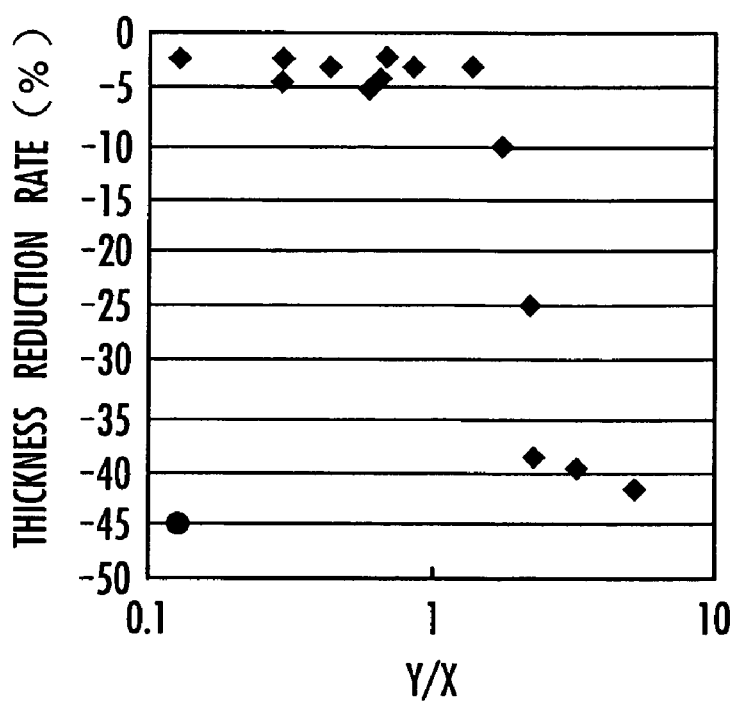
FIG. 4 is a graph showing the relationship between the ratio (Y/X) of the content of fluorine in the polymer electrolyte membrane (Y) to the content of fluorine in the electrode catalyst layer (X) and the creep resistance of the electrode structure.

A load was applied to the above electrode structure at a pressure of 5 kg/cm² for 1,000 hours under the environment of a temperature of 90° C. and a relative humidity of 90%, and then the thickness reduction rate (%) of the electrode structure was measured. The creep resistance was defined as such a thickness reduction rate. The smaller the thickness reduction rate, the higher the creep resistance that can be obtained. The results are shown in Table 2. The relationship between the ratio (Y/X) and creep resistance is shown in FIG. 4.

Figure 5:
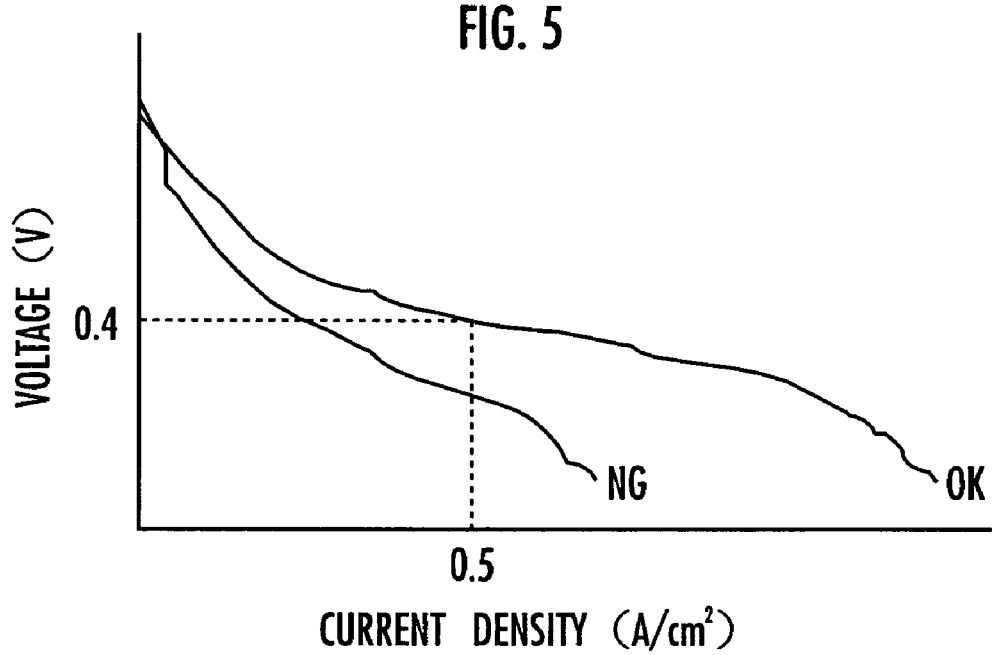
FIG. 5 is a graph showing a method of examining the power generation efficiency of the electrode structure.

The power generation efficiency was evaluated as follows. The above electrode structure was used for a single cell. Air was supplied to one backing layer 3 as an oxygen electrode, whereas pure hydrogen was supplied to the other backing layer 3 as a fuel electrode, so as to generate electric power. Power generation conditions were a temperature of 90° C., a relative humidity of 50% on the fuel electrode side, and a relative humidity of 80% on the oxygen electrode side. As shown in FIG. 5, as current density increased, cell voltage gradually decreased. Thus, cell voltage was measured at a current density of 0.5 A/cm². If the measured cell voltage was 0.4 V or greater, it was evaluated that the cell had a good power generation efficiency. The results are shown in Table 2.

EXAMPLE 5

In the present example, the electrode structure as shown in FIG. 1 was produced completely in the same manner as in Example 4 with the exception that 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 74:26, so as to obtain a fluorine-containing copolymer (n:m=74:26) represented by formula (8).

In the electrode structure in the present example, the content of fluorine in the polymer electrolyte membrane 2 (Y) was 20% by weight, the content of fluorine in the electrode catalyst layer 1 (X) was 24% by weight, and the ratio (Y/X) of the content of fluorine in the polymer electrolyte membrane 2 (Y) to the content of fluorine in the electrode catalyst layer 1 (X) was 0.83.

Thereafter, the oxidation stability, creep resistance, and power generation efficiency of the electrode structure in the present example were evaluated in the same manner as in Example 4. The results are shown in Table 2 and FIGS. 3 and 4.

EXAMPLE 6

In the present example, the electrode structure as shown in FIG. 1 was produced completely in the same manner as in Example 4 with the exception that 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 74:26 to obtain a fluorine-containing copolymer (n:m=74:26) represented by formula (8), and that the weight ratio of an ion conducting polymer binder and carbon black in the above catalyst paste forming the electrode catalyst layer 1 was set at binder:carbon black=1:2.

In the electrode structure in the present example, the content of fluorine in the polymer electrolyte membrane 2 (Y) was 20% by weight, the content of fluorine in the electrode catalyst layer 1 (X) was 15% by weight, and the ratio (Y/X) of the content of fluorine in the polymer electrolyte membrane 2 (Y) to the content of fluorine in the electrode catalyst layer 1 (X) was 1.33.

Thereafter, the oxidation stability, creep resistance, and power generation efficiency of the electrode structure in the present example were evaluated in the same manner as in Example 4. The results are shown in Table 2 and FIGS. 3 and 4.

EXAMPLE 7

In the present example, the electrode structure as shown in FIG. 1 was produced completely in the same manner as in Example 4 with the exception that 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 74:26 to obtain a fluorine-containing copolymer (n:m=74:26) represented by formula (8), and that the weight ratio of an ion conducting polymer binder and carbon black in the above catalyst paste forming the electrode catalyst layer 1 was set at binder:carbon black=7:4.

In the electrode structure in the present example, the content of fluorine in the polymer electrolyte membrane 2 (Y) was 20% by weight, the content of fluorine in the electrode catalyst layer 1 (X) was 35% by weight, and the ratio (Y/X) of the content of fluorine in the polymer electrolyte membrane 2 (Y) to the content of fluorine in the electrode catalyst layer 1 (X) was 0.57.

Thereafter, the oxidation stability, creep resistance, and power generation efficiency of the electrode structure in the present example were evaluated in the same manner as in Example 4. The results are shown in Table 2 and FIGS. 3 and 4.

EXAMPLE 8

In the present example, the electrode structure as shown in FIG. 1 was produced completely in the same manner as in Example 4 with the exception that 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 92:8 to obtain a fluorine-containing copolymer (n:m=92:8) represented by formula (8).

In the electrode structure in the present example, the content of fluorine in the polymer electrolyte membrane 2 (Y) was 7% by weight, the content of fluorine in the electrode catalyst layer 1 (X) was 24% by weight, and the ratio (Y/X) of the content of fluorine in the polymer electrolyte membrane 2 (Y) to the content of fluorine in the electrode catalyst layer 1 (X) was 0.29.

Thereafter, the oxidation stability, creep resistance, and power generation efficiency of the electrode structure in the present example were evaluated in the same manner as in Example 4. The results are shown in Table 2 and FIGS. 3 and 4.

EXAMPLE 9

In the present example, the electrode structure as shown in FIG. 1 was produced completely in the same manner as in Example 4 with the exception that the weight ratio of an ion conducting polymer binder and carbon black in the above catalyst paste forming the electrode catalyst layer 1 was set at binder:carbon black=1:2.

In the electrode structure in the present example, the content of fluorine in the polymer electrolyte membrane 2 (Y) was 10% by weight, the content of fluorine in the electrode catalyst layer 1 (X) was 35% by weight, and the ratio (Y/X) of the content of fluorine in the polymer electrolyte membrane 2 (Y) to the content of fluorine in the electrode catalyst layer 1 (X) was 0.67.

Thereafter, the oxidation stability, creep resistance, and power generation efficiency of the electrode structure in the present example were evaluated in the same manner as in Example 4. The results are shown in Table 2 and FIGS. 3 and 4.

EXAMPLE 10

In the present example, the electrode structure as shown in FIG. 1 was produced completely in the same manner as in Example 4 with the exception that the weight ratio of an ion conducting polymer binder and carbon black in the above catalyst paste forming the electrode catalyst layer 1 was set at binder:carbon black=7:4.

In the electrode structure in the present example, the content of fluorine in the polymer electrolyte membrane 2 (Y) was 20% by weight, the content of fluorine in the electrode catalyst layer 1 (X) was 35% by weight, and the ratio (Y/X) of the content of fluorine in the polymer electrolyte membrane 2 (Y) to the content of fluorine in the electrode catalyst layer 1 (X) was 0.29.

Thereafter, the oxidation stability, creep resistance, and power generation efficiency of the electrode structure in the present example were evaluated in the same manner as in Example 4. The results are shown in Table 2 and FIGS. 3 and 4.

EXAMPLE 11

In the present example, 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 88:12, so as to obtain a fluorine-containing copolymer (n:m=88:12) represented by formula (8). Then, a solution containing a perfluoroalkylene sulfonic acid polymer (Nafion (trade name) from DuPont) was casted on both sides of a membrane formed of the sulfonate of the above obtained copolymer, so as to obtain a composite membrane in which a fluorine-containing ion conducting polymer-coated layer with a dry film thickness of 5 µm was formed. This composite membrane was defined as the polymer electrolyte membrane 2. Moreover, the weight ratio of an ion conducting polymer binder and carbon black in the above catalyst paste forming the electrode catalyst layer 1 was set at binder:carbon black=7:4. Other than the above exceptions, the electrode structure as shown in FIG. 1 was produced completely in the same manner as in Example 4.

In the electrode structure in the present example, the content of fluorine in the polymer electrolyte membrane 2 (Y) was 22% by weight, the content of fluorine in the electrode catalyst layer 1 (X) was 35% by weight, and the ratio (Y/X) of the content of fluorine in the polymer electrolyte membrane 2 (Y) to the content of fluorine in the electrode catalyst layer 1 (X) was 0.63.

Thereafter, the oxidation stability, creep resistance, and power generation efficiency of the electrode structure in the present example were evaluated in the same manner as in Example 4. The results are shown in Table 2 and FIGS. 3 and 4.

EXAMPLE 12

In the present example, 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 74:26, so as to obtain a fluorine-containing copolymer (n:m=74:26) represented by formula (8). Then, a solution containing a perfluoroalkylene sulfonic acid polymer (Nafion (trade name) from DuPont) was casted on both sides of a membrane formed of the sulfonate of the above obtained copolymer, so as to obtain a composite membrane in which a fluorine-containing ion conducting polymer-coated layer with a dry film thickness of 5 µm was formed. This composite membrane was defined as the polymer electrolyte membrane 2. Other than the above exceptions, the electrode structure as shown in FIG. 1 was produced completely in the same manner as in Example 4.

In the electrode structure in the present example, the content of fluorine in the polymer electrolyte membrane 2 (Y) was 40% by weight, the content of fluorine in the electrode catalyst layer 1 (X) was 24% by weight, and the ratio (Y/X) of the content of fluorine in the polymer electrolyte membrane 2 (Y) to the content of fluorine in the electrode catalyst layer 1 (X) was 1.67.

Thereafter, the oxidation stability, creep resistance, and power generation efficiency of the electrode structure in the present example were evaluated in the same manner as in Example 4. The results are shown in Table 2 and FIGS. 3 and 4.

COMPARATIVE EXAMPLE 3

In the present comparative example, the electrode structure as shown in FIG. 1 was produced completely in the same manner as in Example 4 with the exception that a membrane consisting of a perfluoroalkylene sulfonic acid polymer (Nafion 112 (trade name) from DuPont) was used as the polymer electrolyte membrane 2.

In the electrode structure in the present comparative example, the content of fluorine in the polymer electrolyte membrane 2 (Y) was 73% by weight, the content of fluorine in the electrode catalyst layer 1 (X) was 24% by weight, and the ratio (Y/X) of the content of fluorine in the polymer electrolyte membrane 2 (Y) to the content of fluorine in the electrode catalyst layer 1 (X) was 3.04.

Thereafter, the oxidation stability, creep resistance, and power generation efficiency of the electrode structure in the present comparative example were evaluated in the same manner as in Example 4. The results are shown in Table 2 and FIGS. 3 and 4.

COMPARATIVE EXAMPLE 4

In the present comparative example, the electrode structure as shown in FIG. 1 was produced completely in the same manner as in Example 4 with the exception that a membrane consisting of a perfluoroalkylene sulfonic acid polymer (Nafion 112 (trade name) from DuPont) was used as the polymer electrolyte membrane 2, and that the weight ratio of an ion conducting polymer binder and carbon black in the above catalyst paste forming the electrode catalyst layer 1 was set at binder:carbon black=1:2.

In the electrode structure in the present comparative example, the content of fluorine in the polymer electrolyte membrane 2 (Y) was 73% by weight, the content of fluorine in the electrode catalyst layer 1 (X) was 15% by weight, and the ratio (Y/X) of the content of fluorine in the polymer electrolyte membrane 2 (Y) to the content of fluorine in the electrode catalyst layer 1 (X) was 4.87.

Thereafter, the oxidation stability, creep resistance, and power generation efficiency of the electrode structure in the present comparative example were evaluated in the same manner as in Example 4. The results are shown in Table 2 and FIGS. 3 and 4.

COMPARATIVE EXAMPLE 5

In the present comparative example, the electrode structure as shown in FIG. 1 was produced completely in the same manner as in Example 4 with the exception that a membrane consisting of a perfluoroalkylene sulfonic acid polymer (Nafion 112 (trade name) from DuPont) was used as the polymer electrolyte membrane 2, and that the weight ratio of an ion conducting polymer binder and carbon black in the above catalyst paste forming the electrode catalyst layer 1 was set at binder:carbon black=7:4.

In the electrode structure in the present comparative example, the content of fluorine in the polymer electrolyte membrane 2 (Y) was 73% by weight, the content of fluorine in the electrode catalyst layer 1 (X) was 35% by weight, and the ratio (Y/X) of the content of fluorine in the polymer electrolyte membrane 2 (Y) to the content of fluorine in the electrode catalyst layer 1 (X) was 2.09.

Thereafter, the oxidation stability, creep resistance, and power generation efficiency of the electrode structure in the present comparative example were evaluated in the same manner as in Example 4. The results are shown in Table 2 and FIGS. 3 and 4.

COMPARATIVE EXAMPLE 6

In the present comparative example, 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 88:12, so as to obtain a fluorine-containing copolymer (n:m=88:12) represented by formula (8). Then, a solution containing a perfluoroalkylene sulfonic acid polymer (Nafion (trade name) from DuPont) was casted on both sides of a membrane formed of the sulfonate of the above obtained copolymer, so as to obtain a composite membrane in which a fluorine-containing ion conducting polymer-coated layer with a dry film thickness of 15 μm was formed. This composite membrane was defined as the polymer electrolyte membrane 2. Other than the above exceptions, the electrode structure as shown in FIG. 1 was produced completely in the same manner as in Example 4.

In the electrode structure in the present comparative example, the content of fluorine in the polymer electrolyte membrane 2 (Y) was 50% by weight, the content of fluorine in the electrode catalyst layer 1 (X) was 24% by weight, and the ratio (Y/X) of the content of fluorine in the polymer electrolyte membrane 2 (Y) to the content of fluorine in the electrode catalyst layer 1 (X) was 2.08.

Thereafter, the oxidation stability, creep resistance, and power generation efficiency of the electrode structure in the present comparative example were evaluated in the same manner as in Example 4. The results are shown in Table 2 and FIGS. 3 and 4.

COMPARATIVE EXAMPLE 7

In the present comparative example, the electrode structure as shown in FIG. 1 was produced completely in the same manner as in Example 4 with the exception that 2,5-dichloro-4'-(4-phenoxyphenoxy)benzophenone represented by formula (3) was polymerized with 2,2-bis[4-{4-(4-chlorobenzoyl)phenoxy}phenyl]-1,1,1,3,3,3-hexafluoropropane represented by formula (4) at a molar ratio of 97:3, so as to obtain a fluorine-containing copolymer (n:m=97:3) represented by formula (8).

In the electrode structure in the present comparative example, the content of fluorine in the polymer electrolyte membrane 2 (Y) was 3% by weight, the content of fluorine in the electrode catalyst layer 1 (X) was 24% by weight, and the ratio (Y/X) of the content of fluorine in the polymer electrolyte membrane 2 (Y) to the content of fluorine in the electrode catalyst layer 1 (X) was 0.13.

Thereafter, the oxidation stability, creep resistance, and power generation efficiency of the electrode structure in the present comparative example were evaluated in the same manner as in Example 4. The results are shown in Table 2 and FIGS. 3 and 4.

TABLE 2

| | Y/X | Creep resistance (%) | Oxidation stability (%) | Power generation efficiency |
|---|---|---|---|---|
| Example 4 | 0.42 | −3 | −15 | G |
| Example 5 | 0.83 | −3 | −12 | G |
| Example 6 | 1.33 | −3 | −10 | G |
| Example 7 | 0.57 | −5 | −15 | G |
| Example 8 | 0.29 | −2 | −19 | G |
| Example 9 | 0.67 | −2 | −15 | G |
| Example 10 | 0.29 | −4 | −18 | G |
| Example 11 | 0.63 | −4 | −15 | G |
| Example 12 | 1.67 | −10 | −5 | G |
| Comparative Example 3 | 3.04 | −40 | 0 | G |
| Comparative Example 4 | 4.87 | −42 | 0 | G |
| Comparative Example 5 | 2.09 | −39 | 0 | G |
| Comparative Example 6 | 2.08 | −25 | −5 | G |
| Comparative Example 7 | 0.13 | −2 | −45 | G |

"Power generation efficiency: good" means the case wherein a cell voltage of 0.4 V or higher was obtained at a current density of 0.5 A/cm$^2$ As is clear from the results shown in Table 2 and FIGS. 3 and 4, the electrode structures of Examples 4 to 12 in which the ratio (Y/X) of the content of fluorine in the polymer electrolyte membrane 2 (Y) to the content of fluorine in the electrode catalyst layer 1 (X) is within the range between 0.29 and 1.67 are excellent in both creep resistance and oxidation stability. In addition, they are good also in power generation efficiency.

In contrast, it is clear that the electrode structures of Comparative Examples 3 to 6 in which the ratio (Y/X) of the content of fluorine in the polymer electrolyte membrane 2 (Y) to the content of fluorine in the electrode catalyst layer 1 (X) is more than 2.0 are excellent in oxidation stability, but they are poor in creep resistance. Moreover, it is also clear that the electrode structure of Comparative Example 7 in which the above ratio (Y/X) is less than 0.2 is excellent in creep resistance, but it is poor in oxidation stability.

Next, a third embodiment of the electrode structure of the present invention will be explained below.

As shown in FIG. 1, the electrode structure in the present embodiment comprises a pair of electrode catalyst layers 1, 1, a polymer electrolyte membrane 2 sandwiched between both the electrode catalyst layers 1, 1, and backing layers 3, 3 laminated on the electrode catalyst layers 1, 1 respectively.

The electrode catalyst layer 1 contains platinum as a catalyst, and it is produced by screen printing a catalyst paste consisting of a catalyst particle and an ion conducting polymer binder on the backing layer 3, so that the content of platinum on the layer is within the range between 0.01 and 0.8 mg/cm$^2$, and then drying it. The above catalyst particle consists of a platinum particle that is supported by a carbon black (furnace black) particle having an average particle size of 10 to 100 nm at a certain weight ratio (e.g., carbon black:platinum=1:1). The above catalyst paste is prepared by uniformly dispersing the above catalyst particles in a solution containing an ion conducting polymer binder such as a perfluoroalkylene sulfonic acid polymer (e. g., Nafion (trade name) from DuPont) at a certain weight ratio (e.g., catalyst particle:binder solution=1:1).

The backing layer 3 consists of a substrate layer and a carbon paper. The above substrate layer is formed by mixing carbon black and polytetrafluoroethylene (PTFE) particles at a certain weight ratio (e.g., carbon black:PTFE particle=4:6), uniformly dispersing the obtained mixture in a solvent such as ethylene glycol so as to obtain a slurry, and applying the slurry on the one side of the above carbon paper followed by drying it. The catalyst paste screen printed on the backing layer 3 is dried, for example, by drying at 60° C. for 10 minutes and then vacuum drying at 120° C. for 60 minutes.

Examples of a monomer used as the second repeating unit represented by the above general formula (2) include 2,2-bis [4-{4-(4-chlorobenzoyl)phenoxy}phenyl]-1,1,1,3,3,3-hexafluoropropane represented by the following formula (4) and 2-bis[4-{4-(4-chlorobenzoyl)phenoxy}phenyl]sulfone represented by the following formula (5):

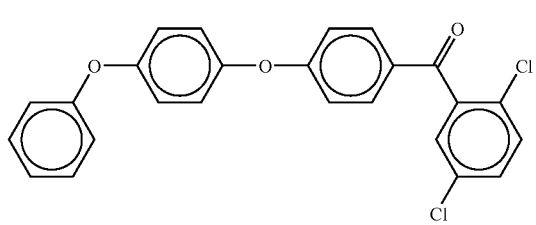

(3)

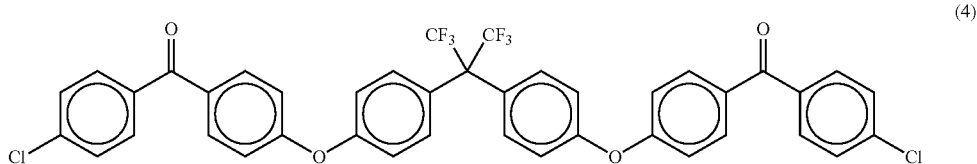

(4)

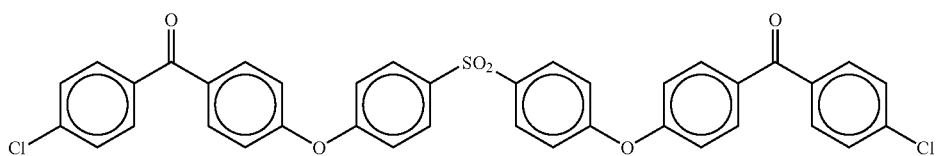

(5)

The polymer electrolyte membrane 2 in the present embodiment is a copolymer obtained by polymerizing a first repeating unit represented by the following general formula (1) and a second repeating unit represented by the following general formula (2) at a certain molar ratio:

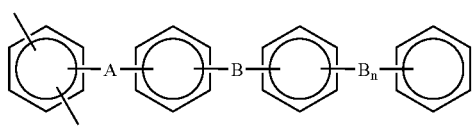

(1)

wherein A represents an electron attracting group, B represents an electron releasing group group, n is an integer of 0 or 1, and a benzene ring includes a derivative thereof, and

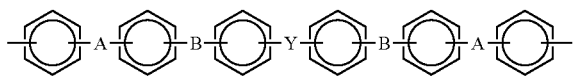

(2)

wherein A represents an electron attracting group, B represents an electron releasing group group, Y represents $-C(CF_3)_2-$ or $-SO_2-$, and a benzene ring includes a derivative thereof.

An example of a monomer used as the first repeating unit represented by the above general formula (1) includes 2,5-dichloro-4'-(4-phenoxyphenoxy)benzophenone represented by the following formula (3).

The above polymer preferably has a polymer molecular weight of 10,000 to 1,000,000 at a weight-average molecular weight shown using polystyrene conversion. If the above polymer molecular weight is less than 10,000, a mechanical strength that is preferable as a polymer electrolyte membrane might not be obtained. If it exceeds 1,000,000, as described later, when the polymer is dissolved in a solvent to form a membrane, the dissolubility decreases or the viscosity of the solution increases, and thereby it becomes difficult to treat the polymer.

Thereafter, concentrated sulfuric acid is added to the above polymer for sulfonation, such that it contains a sulfonic acid group within the range between 0.5 and 3.0 mg equivalent/g. If the obtained sulfonate contains less than 0.5 mg equivalent/g of sulfonic acid group, it cannot obtain a sufficient ion conductivity. If the content of a sulfonic acid group exceeds 3.0 mg equivalent/g, a sufficient toughness cannot be obtained, and it makes difficult to treat the sulfonate during the production of an electrode structure, which will be described later.

The sulfonate of the above polymer is then dissolved in N-methylpyrrolidone to prepare a polymer electrolyte solution. Thereafter, a membrane is formed from the polymer electrolyte solution by the cast method followed by drying in an oven, so as to prepare, for example, the polymer electrolyte membrane 2 having a dry film thickness of 50 µm.

In the present embodiment, the polymer electrolyte membrane 2 is sandwiched between the sides of the electrode catalyst layers 1 of the above electrodes followed by hot pressing, so as to obtain the electrode structure as shown in FIG. 1. The hot pressing is carried out, for example, at 150° C. at 2.5 MPa for 1 minute.

When a separator acting also as a gas passage is further laminated on each of the backing layers 3, 3, the electrode structure in the present embodiment constitutes a polymer electrolyte fuel cell.

Next, the present embodiment will be described in the following examples and comparative examples.

EXAMPLE 13

In the present example, first, 2,5-dichloro-4'-(4-phenoxyphenoxy)benzophenone represented by the above formula (3) was polymerized with 2,2-bis[4-{4-(4-chlorobenzoyl)phenoxy}phenyl]-1,1,1,3,3,3-hexafluoropropane represented by the above formula (4) at a polymerization ratio of 50:50, so as to obtain a copolymer (n:m=50:50) represented by the following formula (8):

num was kept thereon. Then, drying was carried out so as to prepare an electrode catalyst layer 1. Thus, a pair of electrodes were prepared, each of which consisted of the electrode catalyst layer 1 and the backing layer 3. The above drying was carried out by drying at 60° C. for 10 minutes and then vacuum drying at 120° C. for 60 minutes.

Thereafter, the polymer electrolyte membrane 2 was sandwiched between the sides of the electrode catalyst layers 1 of the above electrodes, and hot pressing was then carried out to obtain the electrode structure as shown in FIG. 1. The hot pressing was carried out by performing the first pressing at 80° C. at 5 MPa for 2 minutes and then the second pressing at 160° C. at 4 MPa for 1 minute.

The polymer electrolyte membrane 2 used in the present example had an excellent toughness, and so the process of

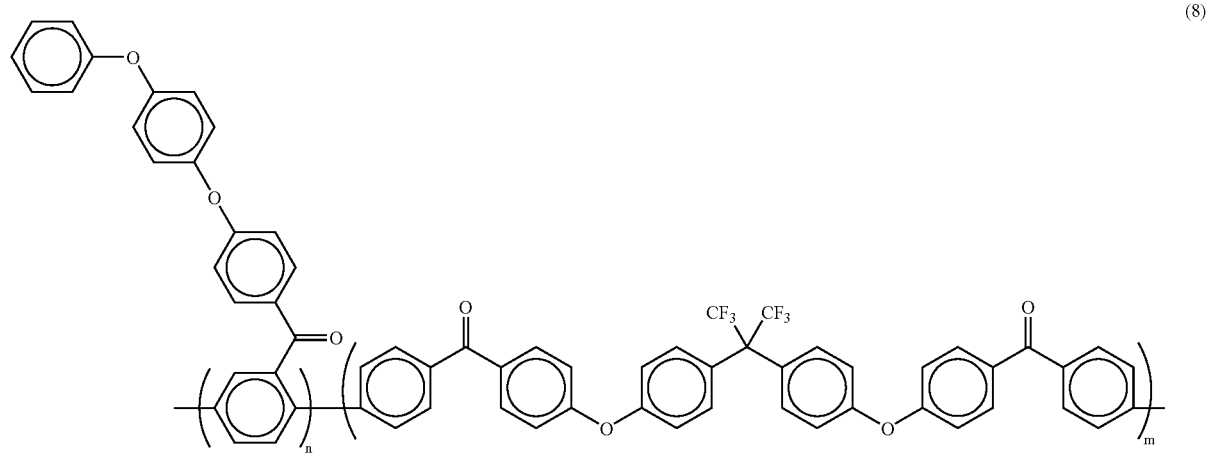

(8)

Thereafter, concentrated sulfuric acid was added to the above copolymer for sulfonation, so as to obtain a sulfonate having an ion exchange capacity of 2.1 meq/g. Thereafter, the sulfonate of the above copolymer was dissolved in N-methylpyrrolidone to prepare a polymer electrolyte solution, and the polymer electrolyte membrane 2 having a dry film thickness of 50 μm was prepared from the polymer electrolyte solution by the cast method.

Subsequently, a platinum particle was supported by carbon black (furnace black) having an average diameter of 50 nm at a weight ratio of carbon black:platinum=1:1, so as to prepare a catalyst particle. Then, the above catalyst particles were uniformly dispersed in a solution containing a perfluoroalkylene sulfonic acid polymer (Nafion (trade name) from DuPont) as an ion conducting binder at a weight ratio of ion conducting binder:catalyst particle=8:5, so as to prepare a catalyst paste.

Thereafter, carbon black was mixed with polytetrafluoroethylene (PTFE) particles at a weight ratio of carbon black: PTFE particle=4:6. The obtained mixture was uniformly dispersed in ethylene glycol to obtain a slurry. The obtained slurry was applied on the one side of the above carbon paper followed by drying it, so as to obtain a substrate layer. Then, two of the backing layers 3 were prepared, each of which consisted of the substrate layer and the carbon paper.

Thereafter, the above catalyst paste was screen printed on each of the above backing layers 3, so that 0.5 mg/cm² platisandwiching the membrane between the above pair of electrodes and performing hot pressing thereon was carried out easily.

Thereafter, the electrode structure obtained in the present example was used for a single cell, and its power generation efficiency was examined. Air was supplied to one backing layer 3 as an oxygen electrode, whereas pure hydrogen was supplied to the other backing layer 3 as a fuel electrode, so as to generate electric power. Electric power was generated at a current density of 1 A/cm² for 200 hours, and thereafter, cell potential was measured at a current density of 1 A/cm². Power generation conditions were a temperature of 85° C., a relative humidity of 40% on the fuel electrode side, and a relative humidity of 75% on the oxygen electrode side.

Figure 6:
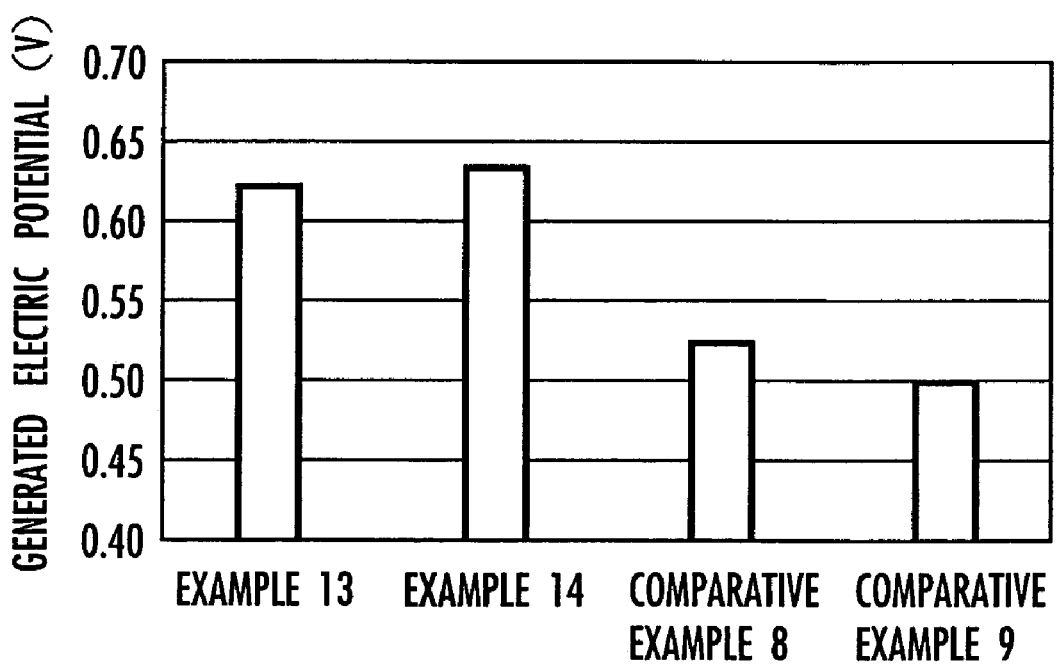
FIG. 6 is a graph showing the power generation efficiency of the electrode structure.

As a result, the cell potential of the electrode structure in the present example was 0.62 V. The results are shown in FIG. 6.

EXAMPLE 14

In the present example, the electrode structure as shown in FIG. 1 was produced completely in the same manner as in Example 13 with the exception that 2,2-bis[4-{4-(4-chlorobenzoyl)phenoxy}phenyl]sulfone represented by the above formula (5) was used instead of 2,2-bis[4-{4-(4-chlorobenzoyl)phenoxy}phenyl]-1,1,1,3,3,3-hexafluoropropane represented by the above formula (4). Then, the obtained electrode structure was used for a single cell, and the power generation efficiency was examined completely in the same manner as in Example 13. As a result, the cell potential of the electrode structure in the present example was 0.63 V. The results are shown in FIG. 6.

COMPARATIVE EXAMPLE 8

In the present comparative example, the electrode structure as shown in FIG. 1 was produced completely in the same manner as in Example 13 with the exception that the polymer electrolyte membrane 2 comprising polyether ether ketone represented by formula (7) indicated below was used. Then, the obtained electrode structure was used for a single cell, and the power generation efficiency was examined completely in the same manner as in Example 13. As a result, the cell potential of the electrode structure in the present comparative example was 0.52 V. The results are shown in FIG. 6.

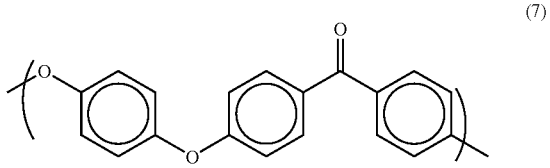

(7)

COMPARATIVE EXAMPLE 9

In the present comparative example, the electrode structure as shown in FIG. 1 was produced completely in the same manner as in Example 13 with the exception that the polymer electrolyte membrane 2 comprising polybenzimidazole was used. Then, the obtained electrode structure was used for a single cell, and the power generation efficiency was examined completely in the same manner as in Example 13. As a result, the cell potential of the electrode structure in the present comparative example was 0.50 V. The results are shown in FIG. 6.

As is clear from FIG. 6, the electrode structures of Examples 13 and 14 have a power generation efficiency much more excellent than the electrode structure (Comparative Example 8) in which the polymer electrolyte membrane 2 comprising polyether ether ketone was used, or than the electrode structure (Comparative Example 9) in which the polymer electrolyte membrane 2 comprising polybenzimidazole was used.

Next, a fourth embodiment of the electrode structure of the present invention will be explained below.

As shown in FIG. 1, the electrode structure in the present embodiment comprises a pair of electrode catalyst layers 1, 1, a polymer electrolyte membrane 2 sandwiched between both the electrode catalyst layers 1, 1, and backing layers 3, 3 laminated on the electrode catalyst layers 1, 1 respectively.

The electrode catalyst layer 1 is formed by screen printing a catalyst paste consisting of a catalyst particle and an ion conducting polymer binder on the backing layer 3, so that a certain amount of catalyst (e.g., 0.5 mg/cm$^2$) is kept thereon, and then drying it. The above catalyst particle consists of a platinum particle that is supported by carbon black (furnace black) at a certain weight ratio (e.g., carbon black:platinum=1:1). The above catalyst paste is prepared by uniformly dispersing the above catalyst particles in an ion conducting polymer binder solution such as a perfluoroalkylene sulfonic acid polymer (e.g., Nafion (trade name) from DuPont) at a certain weight ratio (e.g., catalyst particle:binder solution=1:1).

The backing layer 3 consists of a substrate layer and a carbon paper. The above substrate layer is formed by mixing carbon black and polytetrafluoroethylene (PTFE) particles at a certain weight ratio (e.g., carbon black:PTFE particle=4:6), uniformly dispersing the obtained mixture in a solvent such as ethylene glycol so as to obtain a slurry, and applying the slurry on the one side of the above carbon paper followed by drying it. The catalyst paste screen printed on the backing layer 3 is dried, for example, by drying at 60° C. for 10 minutes and then vacuum drying at 120° C. for 60 minutes.

The polymer electrolyte membrane 2 in the present embodiment is a copolymer obtained by polymerizing a first repeating unit represented by the following general formula (1) and a second repeating unit represented by the following general formula (2) at a certain molar ratio:

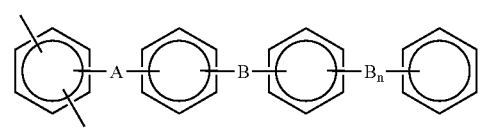

(1)

wherein A represents an electron attracting group, B represents an electron releasing group group, n is an integer of 0 or 1, and a benzene ring includes a derivative thereof, and

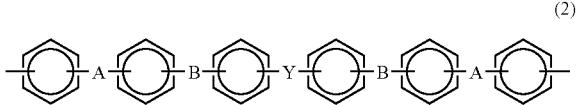

(2)

wherein A represents an electron attracting group, B represents an electron releasing group group, Y represents —C(CF$_3$)$_2$— or —SO$_2$—, and a benzene ring includes a derivative thereof.

An example of a monomer used as the first repeating unit represented by the above general formula (1) includes 2,5-dichloro-4'-(4-phenoxyphenoxy)benzophenone represented by formula (3) indicated below.

Examples of a monomer used as the second repeating unit represented by the above general formula (2) include 2,2-bis[4-{4-(4-chlorobenzoyl)phenoxy}phenyl]-1,1,1,3,3,3-hexafluoropropane represented by the following formula (4) and 2-bis[4-{4-(4-chlorobenzoyl)phenoxy}phenyl]sulfone represented by the following formula (5):

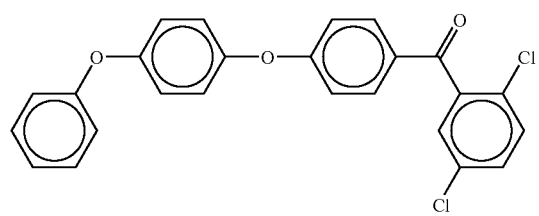

(3)

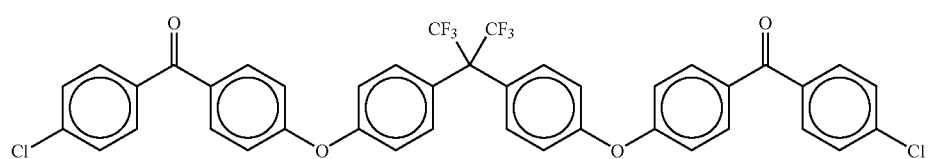

(4)

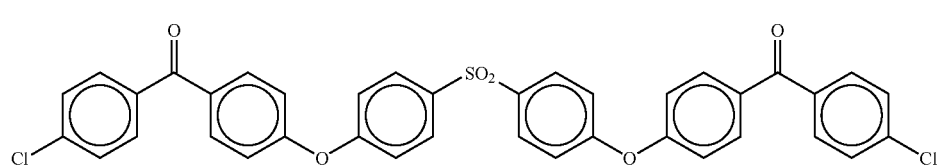

(5)

The above polymer preferably has a polymer molecular weight of 10,000 to 1,000,000 at a weight-average molecular weight shown using polystyrene conversion. If the above polymer molecular weight is less than 10,000, a mechanical strength that is preferable as a polymer electrolyte membrane might not be obtained. If it exceeds 1,000,000, as described later, when the polymer is dissolved in a solvent to form a membrane, the dissolubility decreases or the viscosity of the solution increases, and thereby it becomes difficult to treat the polymer.

Thereafter, concentrated sulfuric acid is added to the above polymer for sulfonation, such that it contains a sulfonic acid group within the range between 0.5 and 3.0 mg equivalent/g. If the obtained sulfonate contains less than 0.5 mg equivalent/g of sulfonic acid group, it cannot obtain a sufficient ion conductivity. If the content of a sulfonic acid group exceeds 3.0 mg equivalent/g, a sufficient toughness cannot be obtained, and it makes difficult to treat the sulfonate during the production of an electrode structure, which will be described later.

The sulfonate of the above polymer is then dissolved in N-methylpyrrolidone as a solvent to prepare a polymer electrolyte solution. Thereafter, a membrane is formed from the polymer electrolyte solution by the cast method followed by drying in an oven, so as to prepare, for example, the polymer electrolyte membrane 2 having a dry film thickness of 50 μm.

In the present embodiment, the polymer electrolyte membrane 2 contains 3 to 15% by weight of the above solvent N-methylpyrrolidone, after drying.

In the present embodiment, the polymer electrolyte membrane 2 is sandwiched between the sides of the electrode catalyst layers 1 of the above electrodes followed by hot pressing, so as to obtain the electrode structure as shown in FIG. 1. The hot pressing is carried out, for example, at 150° C. at 2.5 MPa for 1 minute.

When a separator acting also as a gas passage is further laminated on each of the backing layers 3, 3, the electrode structure in the present embodiment constitutes a polymer electrolyte fuel cell.

Next, the present embodiment will be described in the following examples and comparative examples.

EXAMPLE 15

In the present example, first, 2,5-dichloro-4'-(4-phenoxyphenoxy)benzophenone represented by the above formula (3) was polymerized with 2,2-bis[4-{4-(4-chlorobenzoyl)phenoxy}phenyl]-1,1,1,3,3,3-hexafluoropropane represented by the above formula (4) at a polymerization ratio of 50:50, so as to obtain a copolymer (n:m=50:50) represented by the following formula (8):

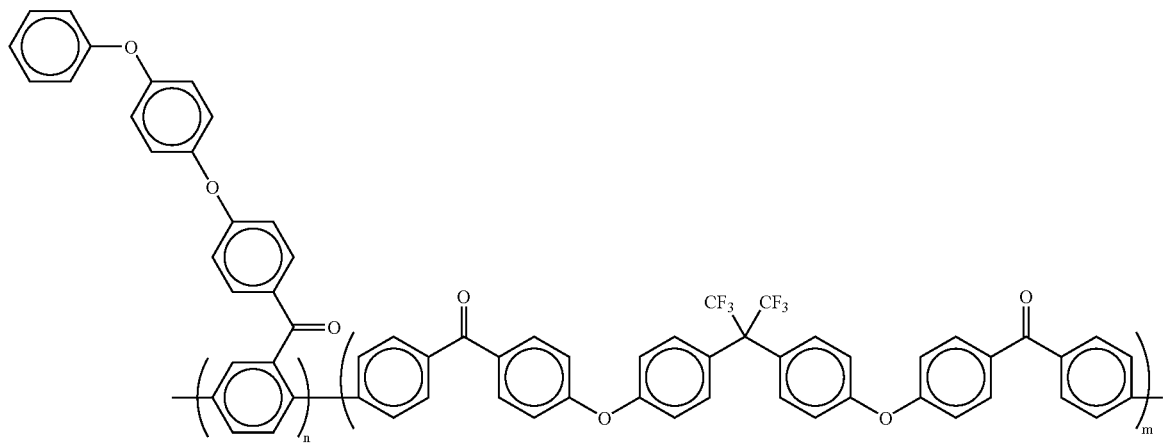

(8)

Thereafter, concentrated sulfuric acid was added to the above copolymer for sulfonation, so as to obtain a sulfonate having an ion exchange capacity of 2.3 meq/g. Thereafter, the sulfonate of the above copolymer was dissolved in N-methylpyrrolidone to prepare a polymer electrolyte solution. A membrane was formed from the polymer electrolyte solution by the cast method followed by drying in an oven, so as to prepare the polymer electrolyte membrane 2 having a dry film thickness of 50 μm. In the present example, 9 types of the polymer electrolyte membranes 2 were prepared by changing the content of the solvent in the above membrane after drying within the range of 0 to 30% by weight.

Subsequently, a platinum particle was supported by carbon black (furnace black) at a certain weight ratio (e.g., carbon black:platinum=1:1), so as to prepare a catalyst particle. Then, the above catalyst particles were uniformly dispersed in a perfluoroalkylene sulfonic acid polymer solution (Nafion (trade name) from DuPont) as an ion conducting binder solution at a weight ratio of ion conducting binder:catalyst particle=8:5, so as to prepare a catalyst paste.

Thereafter, carbon black was mixed with polytetrafluoroethylene (PTFE) particles at a weight ratio of carbon black: PTFE particle=4:6. The obtained mixture was uniformly dispersed in ethylene glycol to obtain a slurry. The obtained slurry was applied on the one side of the above carbon paper followed by drying it, so as to obtain a substrate layer. Then, two of the backing layers 3 were prepared, each of which consisted of the substrate layer and the carbon paper.

Thereafter, the above catalyst paste was screen printed on each of the above backing layers 3, so that 0.5 mg/cm² platinum was kept thereon. Then, drying was carried out so as to prepare an electrode catalyst layer 1. Thus, a pair of electrodes were prepared, each of which consisted of the electrode catalyst layer 1 and the backing layer 3. The above drying was carried out by drying at 60° C. for 10 minutes and then vacuum drying at 120° C. for 60 minutes.

Thereafter, the polymer electrolyte membrane 2 was sandwiched between the sides of the electrode catalyst layers 1 of the above electrodes, and hot pressing was then carried out to obtain the electrode structure as shown in FIG. 1. The hot pressing was carried out by performing the first pressing at 80° C. at 5 MPa for 2 minutes and then the second pressing at 160° C. at 4 MPa for 1 minute.

Subsequently, the initial ion conductivity, ion conductivity retention, and toughness of each of the polymer electrolyte membranes 2 obtained in the present example were measured.

Figure 7:
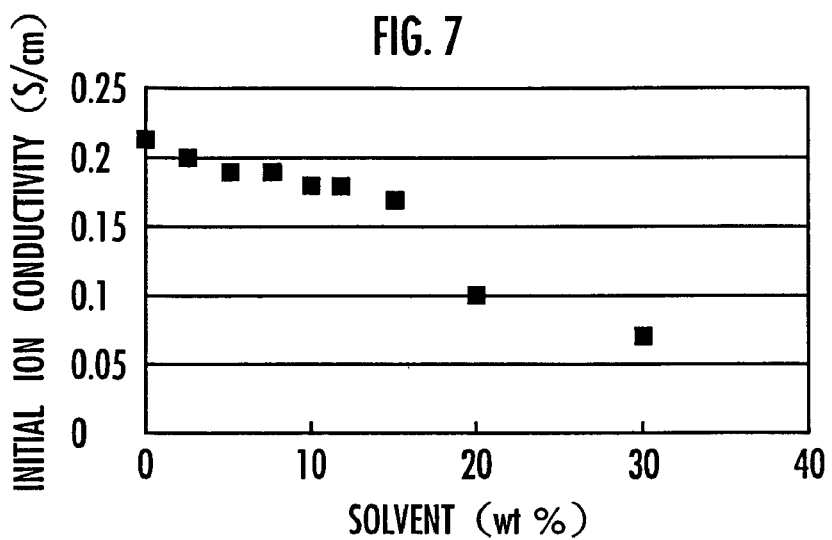
FIG. 7 is a graph showing the relationship between the initial ion conductivity of the polymer electrolyte membrane used for the electrode structure and the amount of a solvent contained in the polymer electrolyte membrane.

The polymer electrolyte membrane 2 was sandwiched between two platinum electrodes, and the initial ion conductivity of the membrane was then measured by the alternating two-terminal method (frequency: 10 kHz) under the conditions of a temperature of 85° C. and a relative humidity of 90%. The results are shown in FIG. 7.

Figure 8:
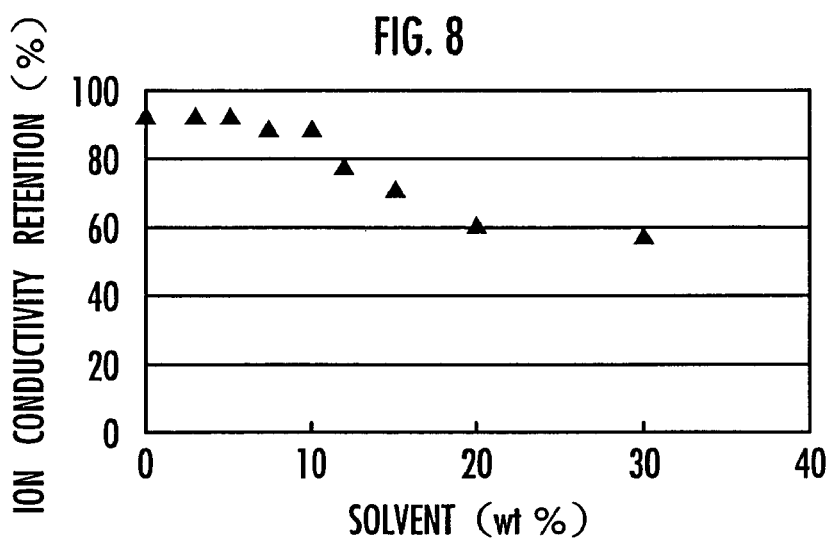
FIG. 8 is a graph showing the relationship between the ion conductivity retention of the polymer electrolyte membrane used for the electrode structure and the amount of a solvent contained in the polymer electrolyte membrane.

Moreover, the polymer electrolyte membrane 2 was left for 60 days after the measurement of the above initial ion conductivity, and thereafter the ion conductivity was measured again by the same method as for the above initial ion conductivity. The ion conductivity retention was calculated as the percentage of the ion conductivity to the above initial ion conductivity. The results are shown in FIG. 8.

Figure 9:
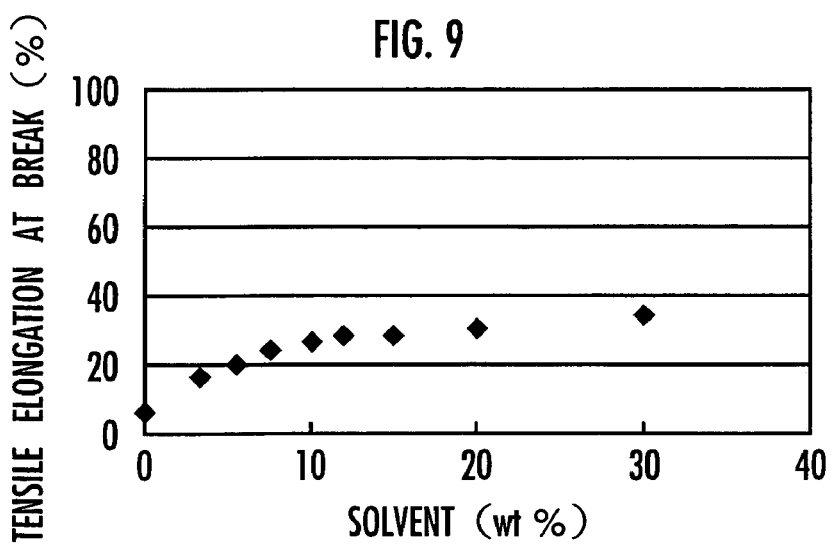
FIG. 9 is a graph showing the relationship between the toughness of the polymer electrolyte membrane used for the electrode structure and the amount of a solvent contained in the polymer electrolyte membrane.

Furthermore, the polymer electrolyte membrane 2 was processed in a dumbbell rated to JIS 7, and the tensile elongation at break was measured under the conditions of a distance between chucks of 20 mm, across head speed of 50 mm/min, a temperature of 25° C. and a relative humidity of 50%. The obtained tensile elongation at break was defined as toughness. The results are shown in FIG. 9.

FIGS. 2 and 3 clearly show that if the content of a solvent in the polymer electrolyte membrane 2 after drying exceeds 15% by weight, the initial ion conductivity and ion conductivity retention of the membrane drastically decrease, and that if the above content is less than 3% by weight, a good tensile elongation at break cannot be obtained, thereby resulting in low toughness.

Accordingly, it is clear that when the content of a solvent in the polymer electrolyte membrane 2 after drying is set within the range between 3 and 15% by weight, the electrode structure of the present example comprising the membrane 2 having the above described ion conductivity can have an excellent power generation efficiency. Moreover, it is also clear that when the content of a solvent in the polymer electrolyte membrane 2 after drying is set within the range between 3 and 15% by weight, the electrode structure of the present example comprising the membrane 2 having the above described tensile elongation at break (toughness) can be easily produced.

COMPARATIVE EXAMPLE 10

In the present comparative example, the sulfonate of the above copolymer was dissolved in dimethylacetamide instead of N-methylpyrrolidone so as to obtain a polymer electrolyte solution, and a membrane was formed from the polymer electrolyte solution by the cast method. Other than the above exceptions, a polymer electrolyte membrane having a dry film thickness of 50 μm and a solvent content after drying of 5% by weight was produced completely in the same manner as in Example 15.

Thereafter, the initial ion conductivity, ion conductivity retention, and toughness of the polymer electrolyte membrane in the present comparative example were measured completely in the same manner as in Example 15. The obtained results as well as the results of the polymer electrolyte membrane 2 in Example 15 whose solvent content after drying is 5% by weight are shown in Table 3.

TABLE 3

| | Initial ion conductivity (S/cm) | Ion conductivity retention (%) | Tensile elongation at break (%) |
|---|---|---|---|
| Example 15 | 0.19 | 94.7 | 21 |
| Comparative Example 10 | 0.20 | 35.0 | 19 |

As is clear from Table 1, the polymer electrolyte membrane formed from a polymer electrolyte solution obtained by dissolving the sulfonate of the above copolymer in N-methylpyrrolidone (Example 15) had an initial ion conductivity and a tensile elongation at break (toughness) substantially equivalent to those of the polymer electrolyte membrane formed from a polymer electrolyte solution obtained by dissolving the sulfonate of the above copolymer in dimethylacetamide (Comparative Example 10). However, the former was superior to the latter in terms of ion conductivity retention. Accordingly, it is clear that the use of the polymer electrolyte membrane in Example 15 enables the production of an electrode structure that has an excellent power generation efficiency.

Next, the embodiment of the production method of the electrode structure of the present invention will be explained below.

As shown in FIG. 1, the electrode structure obtained by the production method of the present embodiment comprises a pair of electrode catalyst layers 1, 1, a polymer electrolyte membrane 2 sandwiched between both the electrode catalyst layers 1, 1, and backing layers 3, 3 laminated on the electrode catalyst layers 1, 1 respectively.

In the production method in the present embodiment, first the polymer electrolyte membrane 2 is produced. To produce the membrane 2, for example, 2,5-dichloro-4'-(4-phenoxyphenoxy)benzophenone represented by the following formula (3) is polymerized with 2,2-bis[4-{4-(4-chlorobenzoyl)phenoxy}phenyl]-1,1,1,3,3,3-hexafluoropropane represented by the following formula (4) at a polymerization ratio of 50:50, so as to obtain a hydrocarbon-based copolymer (n:m=50:50) represented by the following formula (8):

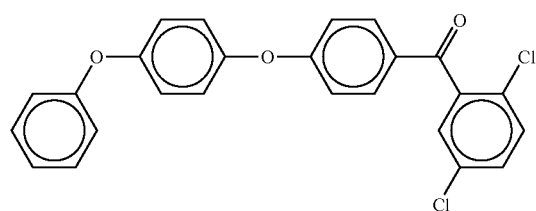

(3)

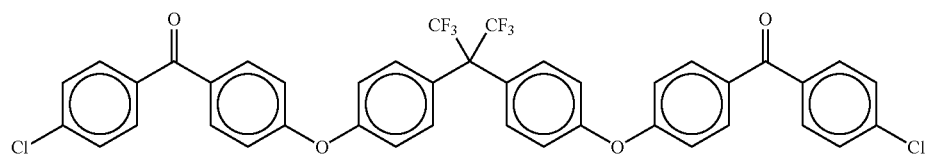

(4)

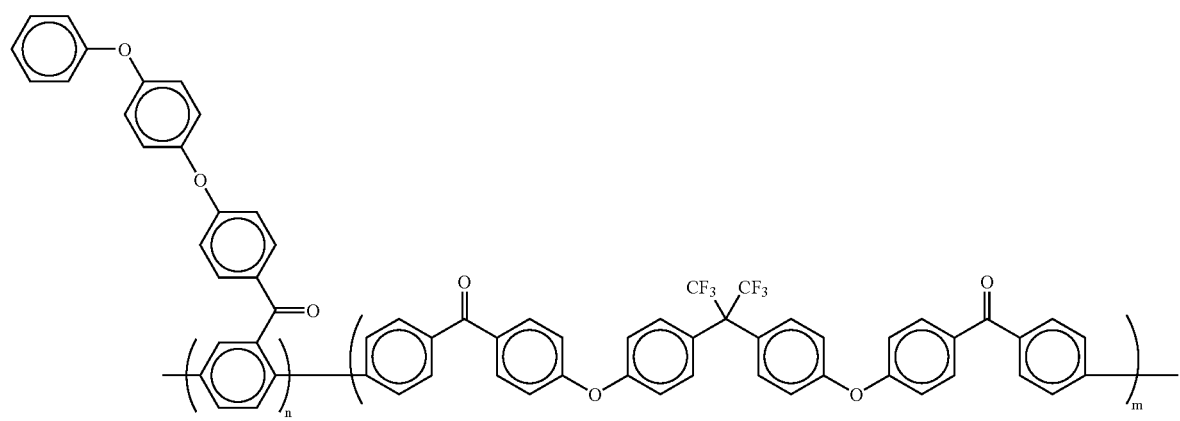

(8)

Then, concentrated sulfuric acid is added to the above copolymer for sulfonation, such that it contains a sulfonic acid group within the range between 0.5 and 3.0 mg equivalent/g. Thereafter, the sulfonate is dissolved in a solvent such as N-methylpyrrolidone to prepare a polymer electrolyte solution Thereafter, a membrane is formed from the polymer electrolyte solution by the cast method followed by drying in an oven, so as to prepare, for example, the polymer electrolyte membrane 2 having a dry film thickness of 50 μm.

In the production method in the present embodiment, next, catalyst particles forming the electrode catalyst layer 1 and a catalyst paste comprising the catalyst particles are prepared. The above catalyst particle consists of a platinum particle that is supported by carbon black (furnace black) at a certain weight ratio (e.g., carbon black:platinum=1:1). The above catalyst paste is prepared by uniformly mixing the above catalyst particles in an ion conducting polymer binder solution such as a perfluoroalkylene sulfonic acid polymer (e.g., Nafion (trade name) from DuPont) at a certain weight ratio (e.g., catalyst particle:binder solution=1:1).

In the production method in the present embodiment, next, the backing layer 3 is produced. The backing layer 3 consists of a carbon paper and a substrate layer. The above substrate layer is formed by mixing carbon black and polytetrafluoroethylene (PTFE) particles at a certain weight ratio (e.g., carbon black:PTFE particle=4:6), uniformly dispersing the obtained mixture in a solvent such as ethylene glycol so as to obtain a slurry, and applying the slurry on the one side of the above carbon paper followed by drying it.

Thereafter, the above catalyst paste is screen printed on the backing layer 3, so that a certain amount of catalyst (e.g., 0.5 mg/cm$^2$) is kept thereon, and then drying it, thereby forming the electrode catalyst layer 1. The catalyst paste screen printed on the backing layer 3 is dried, for example, by drying at 60° C. for 10 minutes and then vacuum drying at 120° C. for 60 minutes.

Thereafter, the polymer electrolyte membrane 2 is sandwiched between a pair of electrode catalyst layers 1, 1 and subjected to hot pressing for integration, so as to obtain the electrode structure as shown in FIG. 1. The hot pressing is carried out, for example, at 150° C. at 2.5 MPa for 1 minute.

In the production method in the present embodiment, next, an electric current of 0.1 to 2 A/cm$^2$ is applied to the above electrode structure for 5 hours or more, preferably for 8 hours or more, in a humidified environment at a relative humidity of 60% or more. As a result, the electrode catalyst layers 1, 1 penetrate into the polymer electrolyte membrane 2, so that the length of the interface is extended. Thus, an electrode structure having an excellent adhesion between the electrode catalyst layers 1, 1 and the polymer electrolyte membrane 2 can be obtained.

As described above, the electrode structure obtained by the production method in the present embodiment adopts a structure such that the electrode catalyst layers 1, penetrate into the polymer electrolyte membrane 2 thereby extending the length of the interface by the above described process of supplying an electric current. Thanks to such a structure, in addition to the original function to generate protons and electrons from reducing gas on the fuel electrode side and to generate water as a result of the reaction of the above protons with oxidizing gas and electrons on the oxygen electrode side, the electrode catalyst layer 1 has a function to generate water as a result of the reaction of oxygen gas with hydrogen gas cross leaking out of the polymer electrolyte membrane 2. As a result, in the electrode structure, both water formed in the reaction of the protons with oxidizing gas and electrons, and water generated due to the above cross leak are efficiently dispersed in the polymer electrolyte membrane 2, thereby providing the effect of enabling low-humidity operation.

When a separator acting also as a gas passage is further laminated on each of the backing layers 3, 3, the electrode structure obtained by the production method in the present embodiment constitutes a polymer electrolyte fuel cell.

Next, the present embodiment will be described in the following examples and comparative examples.

EXAMPLE 16

In the present example, first, 2,5-dichloro-4'-(4-phenoxyphenoxy)benzophenone represented by the above formula (3) was polymerized with 2,2-bis[4-{4-(4-chlorobenzoyl)phenoxy}phenyl]-1,1,1,3,3,3-hexafluoropropane represented by the above formula (4) at a molar ratio of 50:50, so as to obtain a copolymer (n:m=50:50) represented by the above formula (8).

Thereafter, concentrated sulfuric acid was added to the above copolymer for sulfonation, so as to obtain a sulfonate having an ion exchange capacity of 2.1 meq/g. Thereafter, the sulfonate of the above copolymer was dissolved in N-methylpyrrolidone to prepare a polymer electrolyte solution. A membrane was formed from the polymer electrolyte solution by the cast method followed by drying in an oven, so as to prepare the polymer electrolyte membrane 2 having a dry film thickness of 50 μm.

Subsequently, a platinum particle was supported by carbon black (furnace black) at a weight ratio of carbon black:platinum=1:1, so as to prepare a catalyst particle. Then, the above catalyst particles were uniformly dispersed in a solution containing a perfluoroalkylene sulfonic acid polymer (Nafion (trade name) from DuPont) as an ion conducting polymer binder at a weight ratio of binder:carbon black=1:1, so as to prepare a catalyst paste.

Thereafter, carbon black was mixed with polytetrafluoroethylene (PTFE) particles at a weight ratio of carbon black:PTFE particle=4:6. The obtained mixture was uniformly dispersed in a solvent such as ethylene glycol to obtain a slurry. The obtained slurry was applied on the one side of the above carbon paper followed by drying it, so as to obtain a substrate layer. Then, two of the backing layers 3 were prepared, each of which consisted of the substrate layer and the carbon paper.

Thereafter, the above catalyst paste was screen printed on each of the above backing layers 3, so that 0.5 mg/cm$^2$ platinum was kept thereon. Then, drying was carried out so as to prepare an electrode catalyst layer 1. Thus, a pair of electrodes were prepared, each of which consisted of the electrode catalyst layer 1 and the backing layer 3. Thereafter, the polymer electrolyte membrane 2 was sandwiched between the sides of the electrode catalyst layers 1 of the above electrodes, and hot pressing was then carried out for integration, so as to obtain the electrode structure as shown in FIG. 1.

Thereafter, an electric current of 1 A/cm$^2$ was applied to the above electrode structure for 18 hours in a humidified environment at a relative humidity of 100%, so as to complete the electrode structure.

Thereafter, the electrode structure obtained in the present example was used for a single cell. Air was supplied to the oxygen electrode side, whereas pure hydrogen was supplied to the fuel electrode side, so as to generate electric power. A cell potential at a current density of 1 A/cm$^2$ was measured as a generated electric potential. Power generation conditions were a temperature of 80° C., a relative humidity of 80% on the oxygen electrode side, and a relative humidity of 50% on the fuel electrode side. The results are shown in Table 4.

EXAMPLE 17

In the present example, the polymer electrolyte membrane 2 was sandwiched between the sides of the electrode catalyst layers 1 of the electrodes, and hot pressing was then carried out to obtain a integrated electrode structure. Then, an electric current of 0.8 A/cm$^2$ was applied to the thus obtained electrode structure for 24 hours in a humidified environment at a relative humidity of 80%. Other than the above exception, an electrode structure was completed completely in the same manner as in Example 16.

Thereafter, the electrode structure obtained in the present example was used for a single cell, and the generated electric potential was measured completely in the same manner as in Example 16. The results are shown in Table 4.

EXAMPLE 18

In the present example, the polymer electrolyte membrane 2 was sandwiched between the sides of the electrode catalyst layers 1 of the electrodes, and hot pressing was then carried out to obtain a integrated electrode structure. Then, an electric current of 0.3 A/cm$^2$ was applied to the thus obtained electrode structure for 16 hours in a humidified environment at a relative humidity of 85%. Other than the above exception, an electrode structure was completed completely in the same manner as in Example 16.

Thereafter, the electrode structure obtained in the present example was used for a single cell, and the generated electric potential was measured completely in the same manner as in Example 16. The results are shown in Table 4.

EXAMPLE 19

In the present example, the polymer electrolyte membrane 2 was sandwiched between the sides of the electrode catalyst layers 1 of the electrodes, and hot pressing was then carried out to obtain a integrated electrode structure. Then, an electric current of 0.9 A/cm$^2$ was applied to the thus obtained electrode structure for 24 hours in a humidified environment at a relative humidity of 60%. Other than the above exception, an electrode structure was completed completely in the same manner as in Example 16.

Thereafter, the electrode structure obtained in the present example was used for a single cell, and the generated electric potential was measured completely in the same manner as in Example 16. The results are shown in Table 4.

EXAMPLE 20

In the present example, the polymer electrolyte membrane 2 was sandwiched between the sides of the electrode catalyst layers 1 of the electrodes, and hot pressing was then carried out to obtain a integrated electrode structure. Then, an electric current of 0.15 A/cm$^2$ was applied to the thus obtained electrode structure for 24 hours in a humidified environment at a relative humidity of 100%. Other than the above exception, an electrode structure was completed completely in the same manner as in Example 16.

Thereafter, the electrode structure obtained in the present example was used for a single cell, and the generated electric potential was measured completely in the same manner as in Example 16. The results are shown in Table 4.

COMPARATIVE EXAMPLE 11

In the present comparative example, an electrode structure was completed completely in the same manner as in Example 16 with the exception that the process of applying an electric current in a humidified environment was not carried out at all on the electrode structure integrated by sandwiching the polymer electrolyte membrane 2 between the sides of the electrode catalyst layers 1 of the electrodes and performing hot pressing to it.

Thereafter, the electrode structure obtained in the present comparative example was used for a single cell, and its generated electric potential was measured completely in the same manner as in Example 16. The results are shown in Table 4.

COMPARATIVE EXAMPLE 12

In the present comparative example, an electrode structure was completed completely in the same manner as in Example 16 with the exception that an electric current of 0.5 A/cm$^2$ was applied to the electrode structure, which was integrated by sandwiching the polymer electrolyte membrane 2 between the sides of the electrode catalyst layers 1 of the electrodes and performing hot pressing to it, for 12 hours in a humidified environment at a relative humidity of 50%.

Thereafter, the electrode structure obtained in the present comparative example was used for a single cell, and the generated electric potential was measured completely in the same manner as in Example 16. The results are shown in Table 4.

COMPARATIVE EXAMPLE 13

In the present comparative example, an electrode structure was completed completely in the same manner as in Example 16 with the exception that no electric current was applied to the electrode structure that was integrated by sandwiching the polymer electrolyte membrane 2 between the sides of the electrode catalyst layers 1 of the electrodes and performing hot pressing to it, but the electrode structure was retained for 12 hours in a humidified environment at a relative humidity of 90%.

Thereafter, the electrode structure obtained in the present comparative example was used for a single cell, and the generated electric potential was measured completely in the same manner as in Example 16. The results are shown in Table 4.

TABLE 4

| | Relative humidity (%) | Electric current (A/cm$^2$) | Generated electric potential (V) | Evaluation |
|---|---|---|---|---|
| Example 16 | 100 | 1.00 | 0.62 | G |
| Example 17 | 80 | 0.80 | 0.58 | G |
| Example 18 | 85 | 0.30 | 0.56 | G |
| Example 19 | 60 | 0.90 | 0.61 | G |
| Example 20 | 100 | 0.15 | 0.56 | G |
| Comparative Example 11 | Not humidified | Not applied | 0.47 | P |
| Comparative Example 12 | 50 | 0.50 | 0.50 | I |
| Comparative Example 13 | 90 | Not applied | 0.48 | p |

Evaluation:
G . . . good (0.55 V or higher)
I . . . insufficient (0.50 V or higher)
P . . . poor (less than 0.50 V)

Table 4 clearly shows that the electrode structures of Examples 16 to 20 in which an electric current of 0.15 to 1 A/cm$^2$ was applied to the electrode structure for 16 to 24 hours in a humidified environment at a relative humidity of 60% or higher after the electrode catalyst layers 1, 1 were integrated with the polymer electrolyte membrane 2 is superior in a power generation efficiency than the electrode structure of Comparative Example 11 in which the above process was not carried out at all, and that they are also superior in adhesion between the electrode catalyst layers 1, 1 and the polymer electrolyte membrane 2.

Moreover, even when compared with the electrode structure of Comparative Example 12 in which an electric current of 0.5 A/cm$^2$ was applied thereto for 12 hours but it was carried out under a humidified condition of a relative humidity of less than 60%, or the electrode structure of Comparative Example 13 in which it was retained for 12 hours in a humidified environment at a relative humidity of 90% but no electric current was applied thereto, the electrode structures of Examples 16 to 20 have an excellent power generation efficiency, and also have an excellent adhesion between the electrode catalyst layers 1, 1 and the polymer electrolyte membrane 2.

INDUSTRIAL APPLICABILITY

The present invention can be used for a polymer electrolyte fuel cell, which is used in vehicles and the like.

The invention claimed is:

1. An electrode structure for a polymer electrolyte fuel cell comprising a pair of electrode catalyst layers and a polymer electrolyte membrane sandwiched between the electrode catalyst layers,
    wherein said polymer electrolyte membrane is a sulfonate of a hydrocarbon-based polymer comprising a main chain, in which a plurality of benzene rings are bound to one another, directly or through a divalent organic group, and
    wherein said polymer electrolyte membrane comprises an ion conducting polymer containing fluorine in a molecular structure thereof, and the ratio (Y/X) of the fluorine content in said polymer electrolyte membrane (Y) to the fluorine content in said electrode catalyst layer (X) is within the range of 0.2 to 2.0.

2. The electrode structure for a polymer electrolyte fuel cell according to claim 1, wherein said polymer electrolyte membrane contains 5% or more by weight of the water coordinated to protons of sulfonic acid groups based on the total weight of the polymer electrolyte membrane.

3. The electrode structure for a polymer electrolyte fuel cell according to claim 1, wherein that said polymer electrolyte membrane consists of a sulfonate of a copolymer of a first repeating unit represented by the following general formula (1) and a second repeating unit represented by the following general formula (2), and in that the first repeating unit or the second repeating unit contains fluorine:

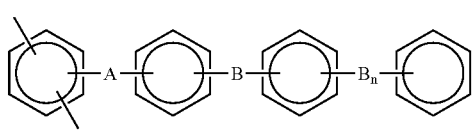

wherein A represents an electron attracting group, B represents an electron releasing group, n is an integer of 0 or 1, and each benzene ring represents one of benzene and a derivative thereof, and

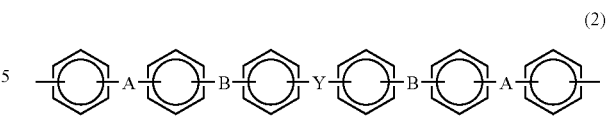

wherein A represents an electron attracting group, B represents an electron releasing group, Y represents —C(CF$_3$)$_2$— or —SO$_2$— and each benzene ring represents one of benzene and a derivative thereof.

4. The electrode structure for a polymer electrolyte fuel cell according to claim 1, wherein that said polymer electrolyte membrane consists of a sulfonate of a copolymer of a first repeating unit represented by the following general formula (1) and a second repeating unit represented by the following general formula (2), and
    in that said electrode catalyst layer contains, as a catalyst, platinum within the range of from 0.01 to 0.8 mg/cm$^2$, and the average diameter of a carbon particle as a carrier supporting the platinum is within the range of from 10 to 100 nm:

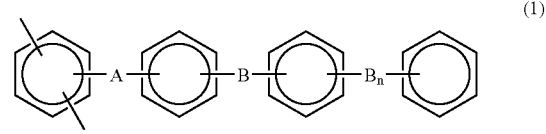

wherein A represents an electron attracting group, B represents an electron releasing group, n is an integer of 0 or 1, and each benzene ring represents one of benzene and a derivative thereof, and

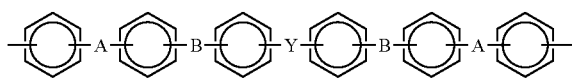

wherein A represents an electron attracting group, B represents an electron releasing group, Y represents —C(CF$_3$)$_2$— or —SO$_2$—, and each benzene ring represents one of benzene and a derivative thereof.

5. The electrode structure for a polymer electrolyte fuel cell according to claim 4, wherein said copolymer comprises from 10 to 80 mol % of said first repeating unit and from 90 to 20 mol % of said second repeating unit.

6. The electrode structure for a polymer electrolyte fuel cell according to claim 4 or 5, wherein the sulfonate of said copolymer contains a sulfonic acid group within the range of from 0.5 to 3.0 mg equivalent/g.

7. The electrode structure for a polymer electrolyte fuel cell according to claim 1, wherein said polymer electrolyte membrane is produced by forming a membrane from a solution obtained by dissolving into a solvent a sulfonate of a copolymer of a first repeating unit represented by the following general formula (1) and a second repeating unit represented by the following general formula (2) and drying the obtained membrane, and the polymer electrolyte membrane contains from 3 to 15% by weight of said solvent after drying:

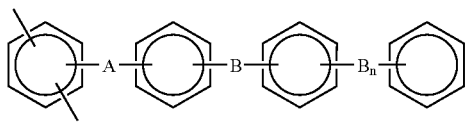
(1)

wherein A represents an electron attracting group, B represents an electron releasing group, n is an integer of 0 or 1, and each a benzene ring represents one of benzene and a derivative thereof, and

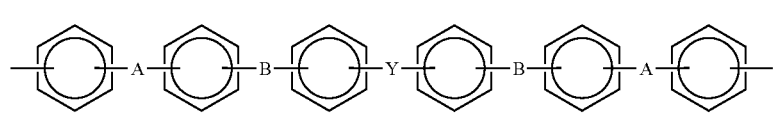
(2)

wherein A represents an electron attracting group, B represents an electron releasing group, Y represents —C(CF$_3$)$_2$— or —SO$_2$—, and a benzene ring represents one of benzene and a derivative thereof.

8. The electrode structure for a polymer electrolyte fuel cell according to claim 7, wherein said solvent is N-methylpyrrolidone.

9. The electrode structure for a polymer electrolyte fuel cell according to claim 7 or 8, characterized in that said copolymer comprises from 10 to 80 mol % of said first repeating unit and from 90 to 20 mol % of said second repeating unit.

10. The electrode structure for a polymer electrolyte fuel cell according to claims 7 to 8, wherein said copolymer contains sulfonic acid groups within the range from 0.5 to 3.0 mg equivalent/g.

11. A polymer electrolyte fuel cell comprising an electrode structure comprising a pair of electrode catalyst layers and a polymer electrolyte membrane held between the electrode catalyst layers, wherein said polymer electrolyte membrane is a sulfonate of a hydrocarbon-based polymer comprising a main chain, in which two or more benzene rings are bound to one another, directly or through a divalent organic group, said electrode catalyst layers comprise a carbon particle supporting a catalyst particle that is integrated by an ion conducting polymer binder containing fluorine in a molecular structure thereof, said polymer electrolyte membrane comprises an ion conducting polymer containing fluorine in a molecular structure thereof, the ratio (Y/X) of the fluorine content in said polymer electrolyte membrane (Y) to the fluorine content in said electrode catalyst layer (X) is within the range of from 0.2 to 2.0, and said polymer electrolyte fuel cell generates power when oxidizing gas is supplied to the one side of said electrode structure and reducing gas to the other side.

12. The polymer electrolyte fuel cell according to claim 11, wherein said polymer electrolyte membrane is a sulfonate of a copolymer of a first repeating unit represented by the following general formula (1) and a second repeating unit represented by the following general formula (2), said electrode catalyst layer contains, as a catalyst, platinum within the range or from 0.01 to 0.8 mg/cm$^2$, and the average diameter of a carbon particle as a carrier supporting the platinum is within the range or from 10 to 100 nm:

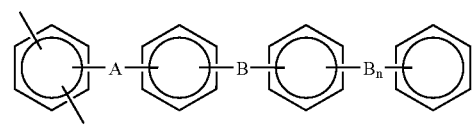
(1)

wherein A represents an electron attracting group, B represents an electron releasing group, n is an integer of 0 or 1, and each benzene ring represents one of benzene and a derivative thereof, and

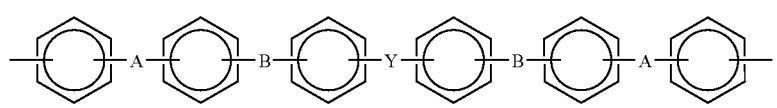
(2)

wherein A represents an electron attracting group, B represents an electron releasing group, Y represents —C(CF$_3$)$_2$— or —SO$_2$—, and each benzene ring represents one of benzene and a derivative thereof.

13. The polymer electrolyte fuel cell according to claim 11, wherein said polymer electrolyte membrane is produced by forming a membrane from a solution obtained by dissolving into a solvent a sulfonate of a copolymer of a first repeating unit represented by the following general formula (1) and a second repeating unit represented by the following general formula (2) and drying the obtained membrane, and in that the membrane contains from 3 to 15% by weight of said solvent after drying:

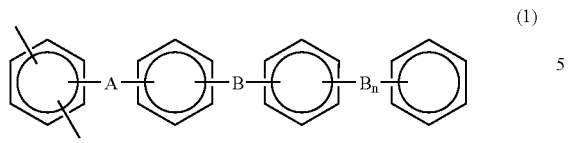
(1)

wherein A represents an electron attracting group, B represents an electron releasing group, n is an integer of 0 or 1, and each benzene ring represents one of benzene and a derivative thereof, and

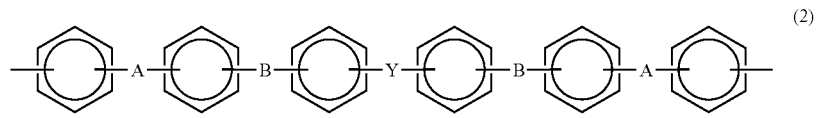
(2)

wherein A represents an electron attracting group, B represents an electron releasing group, Y represents —C(CF$_3$)$_2$— or —SO$_2$—, and each benzene ring represents one of benzene and a derivative thereof.

14. The polymer electrolyte fuel cell according to claim 11, wherein said electrode structure is formed by holding a polymer electrolyte membrane between a pair of electrode catalyst layers to integrate both the electrode catalyst layers and the polymer electrode membrane, and applying an electric current of 0.1 A/cm$^2$ or higher to integrated body of the electrode catalyst layers and the polymer electrolyte membrane for 5 hours or more in a humidified environment at a relative humidity of 60% or more.

* * * * *